US012210890B2

(12) United States Patent
Liu et al.

(10) Patent No.: US 12,210,890 B2
(45) Date of Patent: Jan. 28, 2025

(54) METHODS, SYSTEMS, AND COMPUTER READABLE MEDIA FOR IMPAIRMENT TESTING USING AN EMULATED SWITCHING FABRIC ENVIRONMENT

(71) Applicant: Keysight Technologies, Inc., Santa Rosa, CA (US)

(72) Inventors: Winston Wencheng Liu, Woodland Hills, CA (US); Razvan Ionut Stan, Agoura Hills, CA (US); Thomas Ameling, Woodland Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 955 days.

(21) Appl. No.: 17/171,716

(22) Filed: Feb. 9, 2021

(65) Prior Publication Data
US 2022/0253324 A1    Aug. 11, 2022

(51) Int. Cl.
G06F 9/455      (2018.01)
G06F 11/22      (2006.01)

(52) U.S. Cl.
CPC ...... *G06F 9/45508* (2013.01); *G06F 11/2273* (2013.01)

(58) Field of Classification Search
CPC .. G06F 30/00; G06F 9/45508; G06F 11/2273; G06F 11/261
(Continued)

(56) References Cited

U.S. PATENT DOCUMENTS 4,792,753 A     12/1988  Iwai
5,247,517 A      9/1993  Ross et al.
(Continued)

FOREIGN PATENT DOCUMENTS

CN      107104903 A    8/2017
EP       0895375 A2    2/1999
(Continued)

OTHER PUBLICATIONS

Cao, Jiamin et al,, "TurboNet: Faithfully Emulating Networks with Programmable Switches", IEEE. (Year: 2020).*
(Continued)

*Primary Examiner* — Cedric Johnson

(57) ABSTRACT

One method occurs at an impairment test system. The method includes receiving test configuration information for configuring a testing environment comprising an emulated switching fabric environment implemented using at least one switching application-specific integrated circuit (ASIC), wherein the test configuration information includes testing environment target state information; configuring, using the test configuration information, an impairment test session involving a system under test (SUT) and the emulated switching fabric environment; wherein configuring the impairment test session includes configuring at least one impairment controller for impairing the testing environment during the impairment test session; and initiating the impairment test session, wherein initiating the impairment test session includes generating and sending, using at least one traffic generator, test traffic via the emulated switching fabric environment and effecting at least one impairment of the testing environment during the impairment test session using a feedback control loop and the at least one impairment controller.

20 Claims, 8 Drawing Sheets

(58) Field of Classification Search
USPC .................................................. 703/24, 23
See application file for complete search history.

(56) References Cited

U.S. PATENT DOCUMENTS

| | | | |
|---|---|---|---|
| 5,343,463 A | 8/1994 | Van Tetering et al. |
| 5,390,314 A | 2/1995 | Swanson |
| 5,477,531 A | 12/1995 | McKee et al. |
| 5,535,338 A | 7/1996 | Krause et al. |
| 5,568,471 A | 10/1996 | Hershey et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny et al. |
| 5,671,351 A | 9/1997 | Wild et al. |
| 5,751,963 A | 5/1998 | Umetsu |
| 5,761,486 A | 6/1998 | Watanabe et al. |
| 5,787,147 A | 7/1998 | Gundersen |
| 5,787,253 A | 7/1998 | McCreery et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,279,124 B1 | 8/2001 | Brouwer et al. |
| 6,295,557 B1 | 9/2001 | Foss et al. |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,545,979 B1 | 4/2003 | Poulin |
| 6,601,020 B1 | 7/2003 | Myers |
| 6,621,805 B1 | 9/2003 | Kondylis et al. |
| 6,678,246 B1 | 1/2004 | Smyth |
| 6,711,137 B1 | 3/2004 | Klassen et al. |
| 6,717,917 B1 | 4/2004 | Weissberger et al. |
| 6,826,259 B2 | 11/2004 | Hoffman |
| 6,845,352 B1 | 1/2005 | Wang |
| 6,917,595 B2 | 7/2005 | Chang et al. |
| 7,096,264 B2 | 8/2006 | Bonney et al. |
| 7,099,438 B2 | 8/2006 | Rancu et al. |
| 7,123,616 B2 | 10/2006 | Weissberger et al. |
| 7,143,159 B1 | 11/2006 | Grace et al. |
| 7,222,255 B1 | 5/2007 | Claessens et al. |
| 7,304,951 B2 | 12/2007 | Rhee |
| 7,327,686 B2 | 2/2008 | Standridge |
| 7,342,897 B1 | 3/2008 | Nader et al. |
| 7,366,174 B2 | 4/2008 | MacFaden et al. |
| 7,418,492 B1 | 8/2008 | Cohen et al. |
| 7,486,728 B2 | 2/2009 | Park |
| 7,507,948 B2 | 3/2009 | Park et al. |
| 7,525,473 B2 | 4/2009 | Chu et al. |
| 7,840,664 B2 | 11/2010 | Dugatkin et al. |
| 7,873,056 B2 | 1/2011 | Higuchi et al. |
| 7,908,130 B2 | 3/2011 | Van Ginkel et al. |
| 7,979,225 B2 | 7/2011 | Muller et al. |
| 8,718,070 B2 | 5/2014 | Koponen et al. |
| 8,761,187 B2 | 6/2014 | Barde |
| 8,898,333 B1 | 11/2014 | White et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 9,042,245 B2 | 5/2015 | Tzannes et al. |
| 9,049,271 B1 | 6/2015 | Hobbs et al. |
| 9,065,770 B2 | 6/2015 | Chew et al. |
| 9,231,849 B2 | 1/2016 | Hyoudou et al. |
| 9,294,296 B2 | 3/2016 | Kirschnick et al. |
| 9,503,382 B2 | 11/2016 | DeCusatis et al. |
| 9,544,233 B2 | 1/2017 | Ansari et al. |
| 9,614,689 B2 | 4/2017 | Cook et al. |
| 9,628,339 B1 | 4/2017 | Thai et al. |
| 9,819,551 B2 | 11/2017 | Forster et al. |
| 9,898,317 B2 | 2/2018 | Nakil et al. |
| 9,912,592 B2 | 3/2018 | Sampath et al. |
| 9,971,620 B2 | 5/2018 | Karnes |
| 10,015,072 B2 | 7/2018 | Cantwell et al. |
| 10,063,473 B2 | 8/2018 | Wenig |
| 10,579,408 B2 | 3/2020 | Wang et al. |
| 10,623,296 B2 | 4/2020 | Haramaty et al. |
| 10,649,747 B2 | 5/2020 | Voellmy |
| 10,686,671 B1 | 6/2020 | Mozumdar et al. |
| 10,733,088 B1 | 8/2020 | Sommers |
| 10,742,533 B2 | 8/2020 | Yadav et al. |
| 10,868,730 B2 | 12/2020 | Mozumdar et al. |
| 10,880,019 B1 | 12/2020 | Mestre Adrover et al. |
| 10,880,197 B2 | 12/2020 | Naskar et al. |
| 11,323,354 B1 | 5/2022 | Sommers |
| 11,388,081 B1 | 7/2022 | Sommers et al. |
| 11,405,302 B1 | 8/2022 | Liu et al. |
| 11,483,227 B2 | 10/2022 | Sommers |
| 11,483,228 B2 | 10/2022 | Liu et al. |
| 11,729,087 B2 | 8/2023 | Bergeron et al. |
| 11,765,068 B2 | 9/2023 | Sommers |
| 2001/0016867 A1 | 8/2001 | Hu et al. |
| 2002/0056100 A1 | 5/2002 | Shimomura et al. |
| 2002/0105911 A1 | 8/2002 | Pruthi et al. |
| 2002/0138226 A1 | 9/2002 | Doane |
| 2002/0162059 A1 | 10/2002 | McNeeley et al. |
| 2002/0172205 A1 | 11/2002 | Tagore-Brage et al. |
| 2002/0184527 A1 | 12/2002 | Chun et al. |
| 2003/0009544 A1 | 1/2003 | Wach |
| 2003/0043434 A1 | 3/2003 | Brachmann et al. |
| 2003/0061506 A1 | 3/2003 | Cooper et al. |
| 2003/0069952 A1 | 4/2003 | Tams et al. |
| 2003/0139919 A1 | 7/2003 | Sher et al. |
| 2003/0188003 A1 | 10/2003 | Sylvest et al. |
| 2003/0191590 A1 | 10/2003 | Narayan et al. |
| 2003/0231741 A1 | 12/2003 | Rancu et al. |
| 2004/0111502 A1 | 6/2004 | Oates |
| 2004/0111519 A1 | 6/2004 | Fu et al. |
| 2004/0117474 A1 | 6/2004 | Ginkel et al. |
| 2004/0236866 A1 | 11/2004 | Dugatkin et al. |
| 2005/0021715 A1 | 1/2005 | Dugatkin et al. |
| 2006/0002305 A1 | 1/2006 | Ginzburg |
| 2008/0186968 A1 | 8/2008 | Farinacci et al. |
| 2010/0008305 A1 | 1/2010 | Yeo et al. |
| 2010/0153055 A1 | 6/2010 | Mucha et al. |
| 2012/0120801 A1 | 5/2012 | Ramakrishnan et al. |
| 2013/0013107 A1 | 1/2013 | Felique |
| 2013/0063441 A1 | 3/2013 | Choy et al. |
| 2014/0006570 A1 | 1/2014 | Loos et al. |
| 2014/0047125 A1 | 2/2014 | Hyoudou et al. |
| 2014/0160961 A1 | 6/2014 | Dragulescu et al. |
| 2014/0298335 A1 | 10/2014 | Regev et al. |
| 2014/0321285 A1 | 10/2014 | Chew et al. |
| 2015/0317169 A1 | 11/2015 | Sinha et al. |
| 2015/0334030 A1 | 11/2015 | Vasseur et al. |
| 2015/0365288 A1 | 12/2015 | Van Der Merwe et al. |
| 2017/0126588 A1 | 5/2017 | Anand et al. |
| 2017/0353531 A1 | 12/2017 | Conn |
| 2018/0101631 A1 | 4/2018 | Havard |
| 2019/0222481 A1 | 7/2019 | Hira |
| 2019/0372881 A1 | 12/2019 | Hu et al. |
| 2020/0021512 A1 | 1/2020 | Naskar et al. |

(56) References Cited

U.S. PATENT DOCUMENTS

| | | |
|---|---|---|
| 2020/0028772 A1 | 1/2020 | Laslau |
| 2020/0112524 A1 | 4/2020 | Sindhu et al. |
| 2020/0133688 A1 | 4/2020 | Shinde et al. |
| 2020/0195519 A1 | 6/2020 | Di Martino |
| 2020/0280518 A1 | 9/2020 | Lee et al. |
| 2020/0296023 A1 | 9/2020 | Kumar et al. |
| 2020/0313999 A1 | 10/2020 | Lee et al. |
| 2020/0366588 A1 | 11/2020 | Bergeron |
| 2021/0328902 A1 | 10/2021 | Huselton et al. |
| 2022/0116303 A1 | 4/2022 | Sommers et al. |
| 2022/0116304 A1 | 4/2022 | Sommers et al. |
| 2022/0247661 A1 | 8/2022 | Liu et al. |
| 2023/0115762 A1 | 4/2023 | Ameling et al. |
| 2023/0179506 A1 | 6/2023 | Bergeron et al. |
| 2023/0198883 A1 | 6/2023 | Sommers |
| 2024/0095156 A1 | 3/2024 | Sommers |
| 2024/0179085 A1 | 5/2024 | Biswas et al. |

FOREIGN PATENT DOCUMENTS

| | | |
|---|---|---|
| JP | 4620103 B2 | 1/2011 |
| WO | 02056541 A2 | 7/2002 |
| WO | 2021015802 A1 | 1/2021 |

OTHER PUBLICATIONS

Benet, Cristian Hernandez et al. "OpenStackEmu—A Cloud TestBed Combining Network Emulation with OpenStack and SDN", 2017, 14th IEEE Annual Consumer Communications & Networking Conference (CCNC), IEEE. (Year: 2017).*

Fiandrino, Claudio et al. "openLEON: An End-to-End Emulation Platform from the Edge Data Center to the Mobile User", Sep. 7, 2019, Computer Communications 148, Elsevier B.V. (Year: 2019).*

Notice of Allowance and Fee(s) Due for U.S. Appl. No. 17/067,627 (Oct. 22, 2021).

Advisory Action for U.S. Appl. No. 17/069,768 (Sep. 28, 2021).

Non-Final Office Action for U.S. Appl. No. 17/198,870 (Sep. 17, 2021).

Notice of Allowance and Fee(s) Due for U.S. Appl. No. 17/067,627 (Aug. 20, 2021).

Final Office Action for U.S. Appl. No. 17/069,768 (Jul. 9, 2021).

Non-Final Office Action for U.S. Appl. No. 17/069,768 (Feb. 4, 2021).

Commonly-Assigned, co-pending U.S. Appl. No. 17/067,627 for "Methods, Systems, and Computer Readable Media for Network Testing Using Switch Emulation," (Unpublished, filed Oct. 9, 2020).

Commonly-Assigned, co-pending U.S. Appl. No. 17/069,768 for "Methods, Systems and Computer Readable Media for Active Queue Management," (Unpublished, filed Oct. 13, 2020).

Zhang et al., "HyperV: A High Performance Hypervisor for Virtualization of the Programmable Data Plane," 2017 26th International Conference on Computer Communication and Networks (ICCCN), pp. 1-9 (2017).

Cziva et al., "High-Performance Virtualized SDN Switches for Experimental Network Testbeds," SI:SC16—INDIS, pp. 1-14 (Nov. 8, 2016).

Khalidi, "SONiC: The networking switch software that powers the Microsoft Global Cloud," Blog(/en-us/blog/) Cloud Strategy, ppp. 1-10 (Mar. 8, 2017).

Siron, "What is the Hyper-V Virtual Switch and How Does it Work?" Altaro, pp. 1-22 (Sep. 26, 2019).

Han et al., "Virtualization in Programmable Data Plane: A Survey and Open Challenges," IEEE Open Journal of the Communications Society, pp. 1-7 (2020).

"Networking/SAI," Open Compute, pp. 1-6 (Oct. 2020).

Zhou et al., "HyperTester: High-performance Network Testing Driven by Programmable Switches," In The 15th International Conference on emerging Networking Experiments and Technologies (CoNEXT '19), pp. 1-14 (Dec. 9-12, 2019).

Non-Final Office Action for U.S. Appl. No. 17/542,011 (Sep. 30, 2022).

Notice of Allowance and Fee(s) Due for U.S. Appl. No. 17/217,920 (Mar. 4, 2022).

Non-Final Office Action for U.S. Appl. No. 17/069,768 (Jan. 27, 2022).

Notice of Allowance and Fee(s) Due for U.S. Appl. No. 17/217,920 (Jan. 14, 2022).

Commonly-Assigned, co-pending U.S. Appl. No. 17/498,723 for "Methods, Systems, and Computer Readable Media for Recycling Background Traffic in a Test Environment," (Unpublished, filed Oct. 11, 2021).

Tos et al., "Adaptive RTP Rate Control Method," 2011 35th IEEE Annual Computer Software and Applications Conference Workshops, pp. 1-6 (2011).

Mittal et al., "Dynamic Simulation Control with Queue Visualization," Summer Computer Simulation Conference, pp. 1-7 (Jun. 2005).

Notice of Allowance for U.S. Appl. No. 17/560,187 (Jun. 23, 2023).

"Network Emulator 3," Keysight, pp. 1-7 (Sep. 1, 2022).

"Tc(8)—Linux manual page," https://man7.org/linux/man-pages/man8/tc.8.html, pp. 1-15 (Aug. 27, 2021).

"Network Emulator II—Ethernet," Keysight, pp. 1-9 (Jun. 25, 2021).

Broom, "VoIP Quality Assessment: Taking Account of the Edge-Device," IEEE Transactions on Audio, Speech, and Language Processing, vol. 14, No. 6, pp. 1-7 (Nov. 2006).

Spirent Communications, "Cloud Computing Testing," pp. 1-10 (Apr. 2010).

Notice of Allowance and Fee(s) Due for U.S. Appl. No. 17/162,620, filed Jun. 23, 2022).

Byagowi, A., et al., "Bringing the F16 Network into the Lab," OCP Global Summit, pp. 1-16 (Jan. 29, 2021).

Zhang, C., et al., "MPVisor: A Modular Programmable Data Plane Hypervisor," SOSR, pp. 1-2 (Apr. 3-4, 2017).

Notice of Allowance and Fee(s) Due for U.S. Appl. No. 17/069,768 (Aug. 4, 2022).

Notice of Allowance and Fee(s) Due for U.S. Appl. No. 17/162,620 (Jul. 13, 2022).

Notice of Allowance and Fee(s) Due for U.S. Appl. No. 17/067,627 (Feb. 8, 2022).

"INE Network Emulator Appliance," Technical Specifications, pp. 1-2 (2018).

"TekExpress USB 3.0 (USB-RMT) Automated Receiver Compliance and Margin Test Solutions," Tektronix, pp. 1-154 (2021).

"QSFP DD Loopback Modules," High Speed IO, Amphenol ICC, pp. 1-2 (2021).

Sultana et al., "Flightplan Dataplane Disaggregation and Placement for P4 Programs," 18th {USENIX} Symposium on Networked Systems Design and Implementation, pp. 1-22 (2021).

"Agilent E4219A ATM Network Impairment Emulator," Keysight, pp. 1-5 (2021).

"Spirent Network Emulator," Spirent Communications, pp. 1-11 (Apr. 2021).

"Ethernet Network Emulator," MGA2510 Product Brief, Aukua Systems, pp. 1-2 (2021).

"Chimera Network Impairment Emulator," Xena Networks, pp. 1-2 (2021).

Commonly-Assigned, co-pending U.S. Appl. No. 17/542,011 for "Methods, Systems, and Computer Readable Media for Providing Adaptive Background Test Traffic in a Test Environment." (Unpublished, filed Dec. 3, 2021).

"Network Emulator II—Ethernet 10GE, 1GE, and 100MbE Ethernet Impairment Emulation," Keysight Technologies, pp. 1-8 (Oct. 22, 2020).

Cao et al., "TurboNet: Faithfully Emulating Networks with Programmable Switches," IEEE, pp. 1-11 (2020).

"Datasheet—Albedo Net.Storm," Albedo Telecom, pp. 1-2 (Dec. 23, 2015).

"Albedo Net.Storm," NETSTORM.en, pp. 1-4 (2014).

(56) References Cited

OTHER PUBLICATIONS

"The Value of Network Impairment Testing in Power Grids," Calnex SNE, pp. 1-2 (2006).
Corrected Notice of Allowability for U.S. Appl. No. 17/542,011 (Apr. 4, 2023).
Notice of Allowance and Fee(s) Due for U.S. Appl. No. 17/542,011 (Mar. 27, 2023).
Notice of Allowance and Fee(s) Due for U.S. Appl. No. 17/198,870 (Mar. 24, 2022).
Notice of Allowance for U.S. Appl. No. 17/945,850 (Mar. 25, 2024).
Non-Final Office Action for U.S. Appl. No. 17/498,723 (Mar. 13, 2024).
Non-Final Office Action for U.S. Appl. No. 17/945,850 (Nov. 22, 2023).
Notice of Allowance for U.S. Appl. No. 17/498,723 (Oct. 1, 2024).

\* cited by examiner

400

| TOPOLOGY ID (TID) | TOPOLOGY DESCRIPTION |
|---|---|
| TOP_1 | 1-NEP, 3-stage clos - [a,b,c] switches at each stage, x,y,z speeds and feeds (s&f) |
| TOP_2 | 2-NEPs, 3-stage clos - [a,b,c,d] switches at each stage, r speeds and feeds at NEP 1, stage 1 switches, s speeds and feeds at NEP 2, stage 1 switches, t speeds and feeds at NEP 1, stage 2 switch, u speeds and feeds at NEP 2, stage 2 switch, v speeds and feeds at NEP 1, stage 3 switch, w speeds and feeds at NEP 2, stage 3 switch |
| TOP_3 | 2-NEPs, 5-stage clos - [a,b,c] switches at each stage, w,x,y,z speeds and feeds for each stage respectively |
| TOP_4 | 3-NEPs, 3-stage clos - [a,b,c] switches at PODSW, [d,e] at TORSW, [f] at SPSW, x speeds and feeds at NEP 1 switches, y speeds and feeds at NEP 2 switches, z speeds and feeds at NEP 3 switches |

| TID | NEP ID | EMUL SW ID | LOGICAL PORT | PHYS SW ID | PHYS PORT |
|---|---|---|---|---|---|
| TOP_1 | NEP1 | TORSW1 | 1 | SW1 | 47 |
| TOP_1 | NEP1 | TORSW1 | 2 | SW1 | 14 |
| TOP_1 | NEP1 | TORSW1 | 3 | SW1 | 35 |
| TOP_1 | NEP2 | TORSW2 | 1 | SW2 | 22 |
| TOP_1 | NEP2 | TORSW2 | 5 | SW3 | 77 |
| TOP_1 | NEP2 | TORSW2 | 7 | SW2 | 62 |
| TOP_1 | NEP2 | TORSW2 | 9 | SW3 | 29 |
| ••• | ••• | ••• | ••• | ••• | ••• |
| TOP_4 | NEP2 | TORSW3 | 3 | SW2 | 26 |
| TOP_4 | NEP2 | TORSW3 | 4 | SW2 | 37 |
| TOP_4 | NEP2 | TORSW4 | 1 | SW3 | 18 |
| TOP_4 | NEP3 | TORSW4 | 3 | SW4 | 22 |
| TOP_4 | NEP3 | TORSW4 | 5 | SW5 | 23 |

FIG. 5

| | 'GOOD' STATE CRITERIA (DEFINITION) | 'BAD' STATE CRITERIA (DEFINITION) |
|---|---|---|
| SUT PERFORMANCE | SUT VISIBILITY METRIC 'X' <= 'VALUE' AND SUT VISIBILITY METRIC 'A' != 'VALUE2' | SUT VISIBILITY METRIC 'X' > 'VALUE' OR SUT VISIBILITY METRIC 'A' == 'VALUE2' |
| EMULATED SWITCHING FABRIC (ESF) PERFORMANCE | ESF VISIBILITY METRIC 'Z' < 'VALUE3' | ESF VISIBILITY METRIC 'Z' >= 'VALUE3' |

METHODS, SYSTEMS, AND COMPUTER READABLE MEDIA FOR IMPAIRMENT TESTING USING AN EMULATED SWITCHING FABRIC ENVIRONMENT

TECHNICAL FIELD

The subject matter described herein relates to network testing. More specifically, the subject matter relates to methods, systems, and computer readable media for impairment testing using an emulated switching fabric environment.

BACKGROUND

Data center environments typically provide high reliability and security and typically include networked resources (e.g., virtual or physical servers connected via network switches) sharable by multiple clients of the data center operator. Large data centers are industrial scale operations using as much electricity as a small town. Various data centers may utilize virtualization. For example, a data center may implement multiple virtual machines (VMs) that communicate via a virtual switch (vSwitch), e.g., virtual servers, using a physical central processing unit (CPU)-based server or node in the data center. In this example, each VM may execute an operating system and other software, where each VM may appear as a physical server to end users.

It will be appreciated that an emulated switch of the type described herein is distinctly different from the entity referred to commonly in the industry as a virtual switch. More particularly, a virtual switch is a software application that runs on top of a CPU, which allows communication between virtual machines, where the virtual machines are administered by a virtual machine hypervisor. A vSwitch does not subdivide and allocate resources of an underlying physical switch (e.g., an application-specific integrated circuit (ASIC) chip) into multiple emulated switches, but instead creates a software representation of a completely virtual switch (i.e., there is no mapping to underlying physical switching ASIC hardware).

When testing data center equipment, it is important to make sure that testing mimics real world scenarios and conditions. For example, when testing a data center server or related applications, it may be necessary to mimic or emulate a switching fabric or other resources in the data center and to emulate or approximate various equipment or system related states, e.g., by using various test system configurations or settings and/or effecting various impairments.

Accordingly, a need exists for methods, systems, and computer readable media for impairment testing using an emulated switching fabric environment.

SUMMARY

Methods, systems, and computer readable media for impairment testing using an emulated switching fabric environment are disclosed. One method occurs at an impairment test system implemented using at least one processor. The method includes receiving test configuration information for configuring a testing environment comprising an emulated switching fabric environment implemented using at least one switching application-specific integrated circuit (ASIC), wherein the test configuration information includes testing environment target state information; configuring, using the test configuration information, an impairment test session involving a system under test (SUT) and the emulated switching fabric environment; wherein configuring the impairment test session includes configuring at least one impairment controller for impairing the testing environment during the impairment test session; and initiating the impairment test session, wherein initiating the impairment test session includes generating and sending, using at least one traffic generator, test traffic via the emulated switching fabric environment and effecting at least one impairment of the testing environment during the impairment test session using a feedback control loop and the at least one impairment controller.

According to one system, the system includes an impairment test system implemented using at least one processor. The impairment test system is configured for: receiving test configuration information for configuring a testing environment comprising an emulated switching fabric environment implemented using at least one switching ASIC, wherein the test configuration information includes testing environment target state information; configuring, using the test configuration information, an impairment test session involving a system under test (SUT) and the emulated switching fabric environment; wherein configuring the impairment test session includes configuring at least one impairment controller for impairing the testing environment during the impairment test session; and initiating the impairment test session, wherein initiating the impairment test session includes generating and sending, using at least one traffic generator, test traffic via the emulated switching fabric environment and effecting at least one impairment of the testing environment during the impairment test session using a feedback control loop and the at least one impairment controller.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 4 is a diagram illustrating example switching fabric topology configuration information;

FIG. 5 is a diagram illustrating example port mapping data for mapping emulated switch ports to physical switch ports;

FIG. 6 is a diagram illustrating example testing environment target state information for a test session;

DETAILED DESCRIPTION

Figure 1:
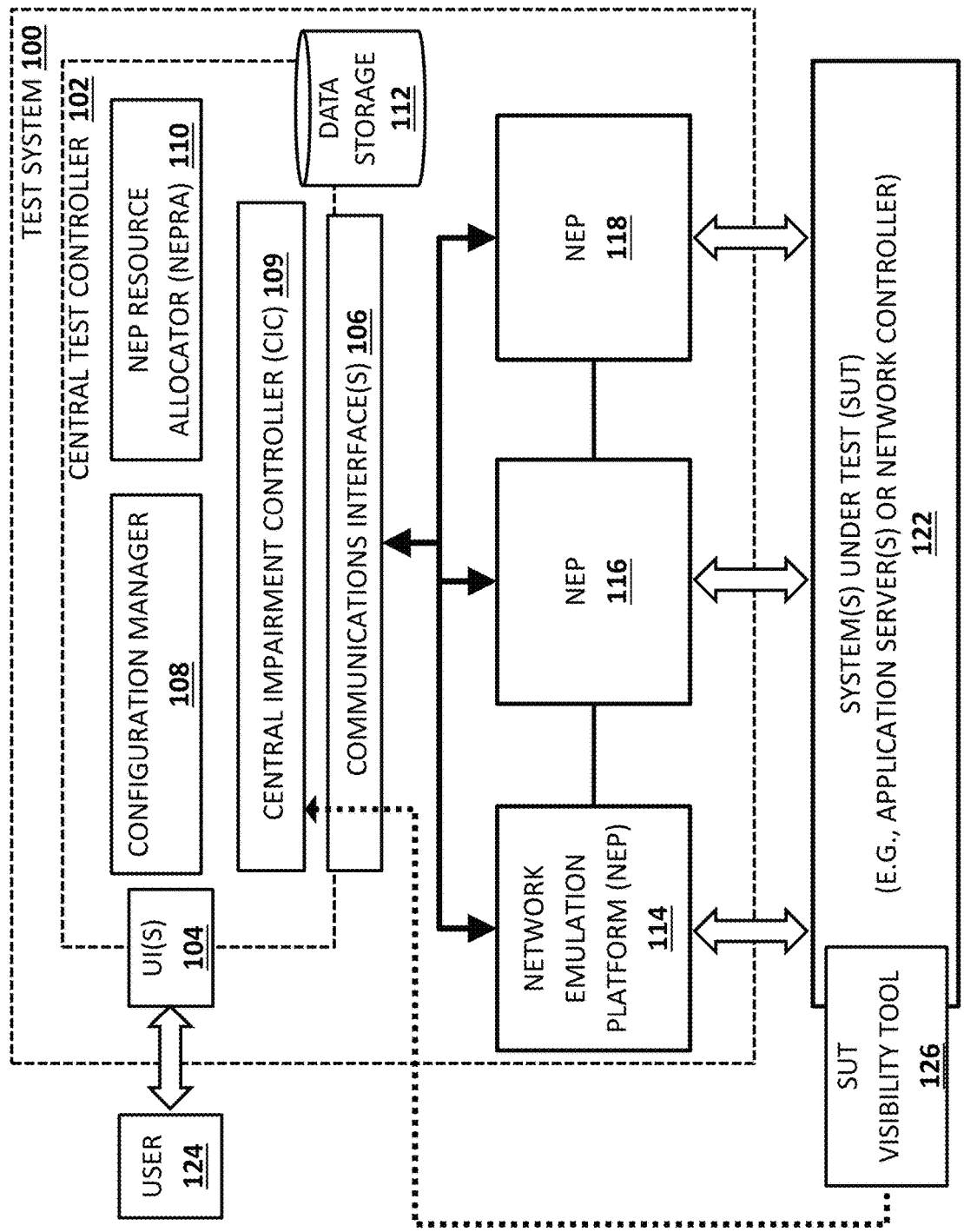
FIG. 1 is a diagram illustrating an example impairment test system for impairment testing.

The subject matter described herein includes methods, systems, and computer readable media for impairment testing using an emulated switching fabric environment. Such switching fabric emulation can be useful for testing how a new network product or service performs at scale in a particular switching fabric environment (e.g., a data center environment) and/or for testing how a new network product or service will impact the performance of a particular switching fabric environment. Impairment testing involves adding impairments (e.g., connectivity and/or processing issues).

In accordance with some aspects of the subject matter described herein, a test system can provide an extensible physical and virtual framework for realistic emulation of data center switching fabrics (e.g., homogenous and heterogenous switching fabric) that can be used to test the performance of various devices, systems, and software (e.g., network interface card (NIC) hardware, server hardware, application software, etc.) in various real-world data center switching fabric environments. In some embodiments, am emulated switching fabric environment may be instrumented with an array of internal sensors that enable the test system to determine or predict the impact of a tested device or service at scale on the performance of a target data center switching fabric.

In accordance with some aspects of the subject matter described herein, a test system (e.g., one or more computing platforms, devices, or nodes) may be configured to emulate a switching fabric environment (e.g., a data center environment), such as virtual networking resources and/or other switching fabric related resources, by using multiple network emulation platforms (NEPs) (e.g., chassis or nodes with one or more physical switching application-specific integrated circuit (ASIC) resources usable for emulating a number of switches connected via various topologies). It will be appreciated that some embodiments include one or more emulated switches, where an emulated switch is a logically allocated portion of a physical switching ASIC of a network emulation platform that appears as an independent logical switch device to the environment (e.g., a DUT, SUT, or controller) by using a NEP resource allocator (NEPRA) and/or a switching ASIC resource allocator (SARA). In some embodiments, the NEPRA and/or SARA is adapted to facilitate collection and reporting of emulated logical switch performance metric information (e.g., emulated logical switch queue depth, emulated logical switch latency, etc.) during a test run or session by a visibility module.

In accordance with some aspects of the subject matter described herein, a test system may be configured to efficiently test network configurations by monitoring and/or analyzing various performance aspects of a SUT associated with an emulated switching fabric environment. For example, an example test system described herein may be configured to emulate a data center environment or switching fabric environment comprising a multi-stage switching network comprising top-of-rack (TOR) switches, switching fabric or pod switches, and spine switches. In this example, the test system may utilize a central test controller that includes a NEPRA and/or a related orchestration layer for assigning multiple NEPs to emulate the data center environment. Using configuration information received via NEPRA or another test system entity, each NEP may utilize a SARA and/or a logical emulation layer to allocate physical switch ports and/or other physical resources to one or more emulated switches. Continuing with this example, the NEPs or entities therein may store related emulation information in one or more data structures for translating communications (e.g., configuration commands or usage report requests) involving virtual and physical resources.

In accordance with some aspects of the subject matter described herein, emulating a switching fabric environment using multiple NEPs (e.g., devices comprising at least one switch usable for emulating switching fabrics) may involve allocating (e.g., statically, semi-statically, or dynamically) to an emulated switch a subset of "front-panel" traffic ports of one or more NEPs for links to a SUT (e.g., servers or hosts that utilize switching fabric services) and for links connecting emulated switches. In some embodiments, external cables may not be required to realize link emulated switches because internal loopback interfaces and related switch pipeline configuration can obviate the need for external cabling within a NEP. In some embodiments, external cables may be used to connect emulated switches because the emulated switches may utilize resources from multiple or different NEPs.

In accordance with some aspects of the subject matter described herein, emulating a switching fabric environment can allow a SUT (e.g., a network management system (NMS), a network operating system (NOS), a software-defined network (SDN) controller, or other entity) to access the emulated switching fabric environment as if it consisted of multiple separate devices, each with their own resources such as traffic ports, buffers/queues, lookup tables, etc. In some embodiments, such emulation can eliminate or reduce the need for the SUT or a testing application to understand the details of the implementation and without requiring the SUT or the testing application to translate emulated switch information to resources of an underlying physical switch and without requiring the SUT or the testing application to monitor control-plane information of each emulated switch by using knowledge of an underlying physical switch's resources.

In accordance with some aspects of the subject matter described herein, impairment testing using an emulated switching fabric environment may be performed, where impairments are applied and adjusted during testing based on feedback and user-specified target state. For example, an example test system described herein may be configured to dynamically adjust impairments during a test session based on observable performance metrics and a user-specified target state (e.g., based on a target state definition comprising conditional rules associated with observable performance metrics). In this example, the testing system may perform impairment adjustments using a closed loop-type feedback control mechanism or another feedback based mechanism.

By utilizing user-specified target state information, visibility infrastructure, and an emulated switching fabric environment, an example test system can perform impairment testing that involves dynamic impairment adjustments. For example, a test system may test a SUT using an emulated switching fabric environment using one or more NEPs, where the test system can utilize monitoring or visibility tools to obtain feedback (e.g., performance metrics) associated with the testing environment including the emulated switching fabric environment and may use the feedback to adjust or change impairments in an attempt to obtain one or more user-specified target states. Hence, a test system in accordance with the present disclosure can test a NOS, an NMS, and/or another entity or group of entities (e.g., application servers) that interact with the emulated switching fabric environment or can predict the impact of a service or node in a real-world data center environment.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example impairment test system 100 for network testing. Test system 100 may represent any suitable entity or entities (e.g., one or more computing platforms, nodes, or devices) associated with testing SUT 122 (e.g., one or more application servers, a network controller, or a network management system). For example, test system 100 may include a central test controller (CTC) 102 for allowing a user 124 (e.g., a human operator or another entity) to configure or select a testing scenario (e.g., using predefined and/or user-defined templates), for generating and sending test traffic to SUT 122, for receiving response traffic from SUT 122, for effecting impairments of the testing environment during testing, and/or for analyzing one or more test results and performance aspects associated with SUT 122.

In some embodiments, test system 100 may include test configuration software, one or more network equipment test devices or platforms, network emulation platforms (NEPs), visibility tools or modules (e.g., physical or virtual network taps), and/or test related software executing on one or more processor(s). In some embodiments, test system 100 may include one or more modules for performing various test related functions. For example, test system 100 may include a traffic (e.g., packet) generator for generating test traffic and/or testing related applications (e.g., a test analyzer or test configuration manager) for testing SUT 122, and an impairment controller for effecting various impairments of a testing environment (e.g., an emulated switching fabric and SUT 122) during one or more test sessions in an effort to reach one or more target states.

In some embodiments, test system 100 or aspects thereof may be controlled or defined using one or more user-definable data models. For example, test system 100 may allow user 124 to configure or modify a resource allocator model, a switching model, a data center emulation or switching topology model, a traffic generator model, a network visibility model, etc. In this example, high-level or user-definable data models may be converted into lower-level data models or into computer readable instructions for implementing an emulated switching fabric environment using the user-definable data models and resources in one or more of NEPs 114-118.

SUT 122 may be any suitable entity or entities (e.g., devices, systems, or platforms) for receiving, processing, forwarding, and/or sending one or more messages (e.g., packets). In some embodiments, SUT 122 may include one or more logical or physical partition. For example, SUT 122 may include a network node, a network switch, a network router, a network interface card, a packet forwarding device, or one or more virtual network functions (VNF). In this example, SUT 122 or a VNF thereof may be software in a virtual container (VC) or machine (VM) executing on shared resources (e.g., compute, storage, and network resources in a cloud computing environment). In some embodiments, nodes or a VNF of SUT 122 may include processing logic (e.g., rules associated with packet forwarding/processing) that is independent or separate from another portion of SUT 122 or another VNF.

SUT visibility tool 126 may be any suitable entity or entities (e.g., software executing on a processor, an ASIC, an FPGA, or a combination of software, an ASIC, or an FPGA) for monitoring, obtaining, and/or providing SUT performance or related visibility information (e.g., using virtual or physical probes or network taps). For example, SUT visibility tool 126 may include an application programming interface (API) based server or interface that provides collected SUT performance metrics or other related information to test system 100 or entities therein. In this example, SUT visibility tool 126 may obtain various SUT performance related data from one or more visibility related devices, applications, or nodes within or around SUT 122. Continuing with this example, SUT visibility tool 126 may generate performance reports or test analysis reports associated with SUT 122 and may send the reports to test system 100 or entities therein for analysis or other purposes.

Test system 100 may include CTC 102 and multiple NEPs, e.g., NEPs 114-118. CTC 102 may be any suitable entity or entities (e.g., software executing on a processor, a field-programmable gateway array (FPGA), and/or an ASIC, or a combination of software, an FPGA, and/or an ASIC) for performing one or more aspects associated with configuring a testing environment or a related testing scenario. In some embodiments, CTC 102 may be implemented using one or more processors and/or memory and may be a single device or node or may be distributed across multiple devices or nodes, e.g., cloud-based. For example, CTC 102 may act as a centralized, cloud-based entity for receiving user input related to setting up a testing scenario involving an emulated switching fabric environment via one or more UI(s) 104 and may use the user input for configuring NEPs 114-118 or other test system entities for the testing scenario. In this example, CTC 102 may send sets of configuration instructions to various modules or entities, e.g., one or more NEPs 114-118 for setting up or configuring an emulated switching fabric environment.

In some embodiments, CTC 102 may include a configuration manager (CM) 108. CM 108 may be any suitable entity or entities (e.g., software executing on a processor, an FPGA, and/or an ASIC, or a combination of software, an FPGA, and/or an ASIC) for performing one or more aspects associated with interfacing with user 124 and/or providing access to various test related services. In some embodiments, CM 108 may include an application programming interface (API) server or gateway and may be usable for providing one or more of UI(s) 104. For example, UI(s) 104 can be usable for provisioning test system 100, controlling test execution, and accessing or viewing test result information including emulated switching fabric environment performance information. In this example, user 124 may communicate with an API server or other test system entity via an external API that is implemented using a remote procedure call (RPC) protocol, e.g., TOPO gRPC.

In some embodiments, CM 108 (or a related API server or gateway) may provide access to several test related services (e.g., traffic generation, visibility and switching fabric emulation, chassis resource, test session generation) with which the user can interact, provision, or control. For example, via one or more APIs or UI(s) 104 associated with CM 108, user 124 can provide test traffic generation requirements for a test session; provide or request test result performance metrics; provide data center or switching fabric emulation requirements or configurations; provide which of NEPs 114-118 or related resources are available for use in a test session; and/or provide test session definitions and associated configuration parameters.

In some embodiments, CTC 102, CM 108, and/or a central impairment controller (CIC) 109 may include or utilize one or more UI(s) 104 for receiving settings and/or configuration information for setting up a testing scenario or a related test session. For example, UI(s) 104 may include any interface usable by one or more types of user 124 (e.g., a human or another entity like an application, a machine, or a device) to interact with test system 100 or related entities. In some embodiments, one or more of UI(s) 104 may support automation e.g., via one or more programming languages (e.g., python), a representation state transfer (REST) API, a remote procedure call API (e.g., gRPC API), a command line interface (CLI), a machine-to-machine (M2M) automation interface, and/or a web based GUI.

In some embodiments, UI(s) 104 may include or utilize a GUI or other user interface for selecting and/or configuring emulated switching fabric environments and/or other related settings (e.g., test reporting and/or network visibility settings). For example, CTC 102 and/or CM 108 may provide a web based GUI for obtaining a test operator or another entity's intent for setting up or configuring testing scenarios and/or related emulated switching fabric environments. In this example, the web based GUI may be usable for visually defining a data center switching topology comprising one or more emulated switches and/or to indicate particular physical resources to allocate to each emulated switch. In another example, the web based GUI may be usable for gathering test session settings and/or for providing cabling instructions for interconnecting NEPs 114-118 or other entities associated with a test session or test system 100.

In some embodiments, UI(s) 104 may include or utilize a GUI or other user interface for selecting and/or configuring impairment test session related data, e.g., testing environment target state information, impairment generation rules, impairment scenarios, and/or particular impairments to effect during one or more test sessions. In this example, UI(s) 104 may be a GUI for user 124 to select or define performance state category associations (e.g., definitions for identify a 'good' performance state and/or tad' performance state) for both an emulated switching fabric environment and SUT 122 of a testing environment. In this example, user 124 may select or specify the type(s) of impairment or chaos available during one or more test sessions (e.g., in an effort to reach, avoid, or maintain one or more of the user-specified performance states or combinations thereof) and may provide any necessary impairment related input (e.g., parameter values or settings) for the selected impairment or chaos.

Example impairment related input may include specifying which impairment sources or "knobs" are available for perturbation or adjustment during execution of a test session and to what extent these sources or "knobs" can be adjusted. Some example impairment sources may include test system generated test traffic behavior (e.g., impairing or adjusting the type and amount of test traffic generated by test system 100 or entities therein); emulated switch fabric environment behavior (e.g., impairing or adjusting how emulated switches handle certain traffic or routes); third-party or non-test traffic behavior (e.g., impairing or adjusting the type and amount of non-test traffic generated by entities outside the control of test system 100); and third-party network behavior (e.g., impairing or adjusting network conditions or traffic characteristics to affect the behavior of network nodes or resources that are separate from test system 100).

In some embodiments, CM 108 may communicate or interact with CIC 109. CIC 109 may be any suitable entity or entities (e.g., software executing on a processor, an FPGA, and/or an ASIC, or a combination of software, an FPGA, and/or an ASIC) for performing one or more aspects associated with controlling, generating, or effecting one or more impairments of a testing environment during a test session. In some embodiments, CIC 109 may receive impairment test session related data from CTC 102 and/or CM 108.

In some embodiments, CIC 109 may include or utilize software (e.g., a distributed control and orchestration layer or related API) that provides one or more interfaces for communicating with various test system entities (e.g., impairment actuators or controllers in NEPs 114-118) for effecting impairments of an emulated switching fabric environment and visibility tools (e.g., SUT visibility tool 126 and/or NEP visibility modules) for obtaining performance related metrics during a test session. In such embodiments, CIC 109 may use gathered performance metrics and user-defined target state information for various purposes, such as determining whether to (re)adjust impairments or whether a target state has been reached or a stop condition for a test session is met.

In some embodiments, CIC 109 or related entities (e.g., impairment controllers in NEPs 114-118) may include functionality (e.g., software or logic) for using user-specified impairment test session related data to impair a testing environment via manipulation of one or more impairment sources, e.g., using a closed loop-type feedback control mechanism or other feedback based mechanism. For example, CIC 109 or related entities may manipulate or adjust impairment sources using impairment control logic, e.g., impairment generation rules and associated processing logic and/or using an inference engine based on a trained neural network or other machine learning technique. In this example, impairment control logic may include rules or instructions for determining when to effect impairments, to what extent, and in what order depending on current or expected near-future conditions, e.g., based on observable metrics from test system entities (e.g., NEP visibility modules) or other entities external to test system 100 (e.g., SUT visibility tool 126).

In some embodiments, CIC 109 or related entities (e.g., impairment controllers in NEPs 114-118) may include functionality for adjusting impairments of a testing environment or aspects thereof using a feedback control loop. For example, CIC 109 or related entities may include or interact with a feedback controller element configured for adjusting a testing environment (e.g., an emulated switch fabric environment and SUT 122) to or towards a user-specified target state (e.g., defined as a collection of conditional rules associated with observable performance metrics).

In some embodiments, CIC 109 or related entities (e.g., impairment controllers in NEPs 114-118) may include or interact with one or more visibility modules (e.g., SUT visibility tool 126 and/or NEP visibility modules) for obtaining and processing performance metrics or related information (e.g., external or internal event data). In such embodiments, the obtained performance metrics or related information may be used in generating one or more feedback control error signal(s) which may be usable for dynamically adjusting one or more impairment source "knobs" in an attempt to move a testing environment to or towards a target state.

In some embodiments, CM 108 may communicate or interact with a NEP resource allocator (NEPRA) 110. NEPRA 110 may be any suitable entity or entities (e.g., software executing on a processor, an FPGA, an ASIC, or a combination of software, an FPGA, and/or an ASIC) for performing one or more aspects associated with communicating with and/or controlling NEPs or related resources. For example, NEPRA 110 may include or utilize software (e.g., a distributed control and orchestration layer or related API) that provides an interface for communicating with NEPs 114-118 or other test system entities and may be effectively hidden from user 124.

In some embodiments, NEPRA 110 may allocate and manage resources of NEPs 114-118 for emulated switches without requiring a custom ASIC or hardware pipeline. In some embodiments, NEPRA 110 can be external or internal to CM 108.

In some embodiments, NEPRA 110 may include a resource allocator function configured for accessing user-specified switching fabrication emulation requirements or specification information and NEP resource information (e.g., user input and/or predefined knowledge) and to effectively translate the user's declared data center switching fabric emulation specification into a mapping of NEP resources and associated physical resource allocations, e.g., ASIC switch resources in one or more of NEPs 114-118).

For example, after user 124 specifies a switching fabric environment to be emulated (e.g., based on a library of pre-defined switching fabric environments) and specifies that only NEPs 114 and 116 are available for use in emulating the target data center topology, NEPRA 110 (or a related resource allocator function) may access a NEP resource information database and generate a physical switch resource allocation map that is applied to the switches (e.g., ASICs, SoCs, etc.) contained in NEPs 114 and 116. In this example, the generated physical switch resource allocation map may effectively enable the switch resources in NEPs 114 and 116 to emulate the user-specified target data center topology.

Continuing with the above example, if user 124 subsequently selects NEP 118 to be added to the emulated switching fabric environment, NEPRA 110 or a related entity (e.g., a resource allocator function) may generate a new or updated physical switch resource allocation map that is applied to the switches contained in NEPs 114-118, where the updated physical switch resource allocation map may effectively enables the switch resources in NEPs 114-118 to emulate the user-specified target data center topology.

In some embodiments, NEPRA 110 may include a logical to physical adaptor usable for converting and/or translating communications to refer to virtual or physical resources depending on the destination. For example, when requesting information about available switching resources via NEPRA 110, external applications, user 124, and/or SUT 122 may "see" a set of emulated switches each with a subset of resources instead of physical switches in one of NEPs 114-118. In this example, e.g., for NEP 114, logical to physical adaptor 212 may translate information about logical resources into information physical resources of a switch (e.g., a Tomahawk 3 series switch) and vice versa so that interacting nodes may remain unaware of the underlying switch(es) or related switch resources. Continuing with this example, e.g., for NEP 116, logical to physical adaptor 212 may translate information about logical resources into information physical resources of a different type of switch (e.g., a Tomahawk 4 series switch) and vice versa so that interacting nodes may remain unaware of the underlying switch (es) or related switch resources.

In some embodiments, NEPRA 110 may act as an orchestrator and reside between a device interface and interacting entities, e.g., SUT 122, testing applications in NEPs 114-118, or external devices. In such embodiments, NEPRA 110 may act as a communications proxy or agent using a logical interface and an intermediate protocol or API. For example, after a test session is completed, NEPRA 110 may receive a user-specified request for requesting emulated switch performance metrics and, in response, may process or translate the request using a relevant generated physical switch resource map to query or poll the appropriate switch resources (e.g., in NEPs 114-118) in order to obtain and/or synthesize the relevant emulated switching fabric performance information. In this example, the emulated switching fabric performance information may be accessible to user 124 via one or more APIs or UI(s) 104.

In some embodiments, emulated switch performance data associated with various switching levels or stages and types of generated test traffic may be queried or polled (e.g., on-demand, at prescribed intervals, periodically during test execution, etc.) and stored by test system 100 or entities therein. In such embodiments, the emulated switch performance data may be accessible to user 124 via one or more APIs or UI(s) 104.

In some embodiments, test system 100 or entities thereof (e.g., CTC 102, CIC 109, and/or NEPRA 110) may utilize communications interface(s) 106 for interacting with various entities. Communications interface(s) 106 may include or utilize any suitable entity or entities (e.g., one or more network interface cards (NICs), pluggable jacks, physical processors, transceiver modules, direct-attach cables (DACs) and/or other hardware) for sending or receiving communications. For example, communications interface(s) 106 (e.g., physical or virtual links) may allow CTC 102 or other entities (e.g., CM 108 or NEPRA 110) to send configuration information, settings, instructions, or other data to one or more of NEPs 114-118. In another example, communications interface(s) 106 (e.g., via physical or virtual links) may allow CTC 102, CIC 109, or other entities to receive test results or feedback from SUT visibility tool 126, NEP visibility tools, or other entities.

Each of NEPs 114-118 may include hardware and software usable for network emulation and/or switching fabric emulation. For example, each of NEPs 114-118 may be a distinct or separate chassis comprising an implementation of a particular switch processor (e.g., a switching ASIC, a system on a chip (SoC), custom hardware, an FPGA, a software switch, etc.), and dedicated data and control plane test traffic generation hardware resources (e.g., an FPGA, a CPU, a programmable data plane device like a P4 device, etc.). In some embodiments, NEPs 114-118 may be interconnected via various communication ports or links, e.g., 10 gigabit (10 G) links, 25 gigabit (25 G) links, 40 gigabit (40 G) links, 100 gigabit (100 G) links, etc.

In some embodiments, test system 100 or entities thereof (e.g., CTC 102, testing applications 114, and/or NEPRA 110) may include functionality for accessing data storage 112. Data storage 112 may be any suitable entity or entities (e.g., a storage device, a non-transitory computer readable medium, or a storage system) for maintaining or storing information related to data center emulation, network testing, or related test analysis. For example, data storage 112 may include data center emulation data (e.g., NEP resources to emulated switches, physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 112 may also include test traffic models, test sessions, test session data, topology information for emulated switching fabric environments and/or for SUT 122, and/or other information usable for generating performance metrics (e.g., statistics) associated with one or more aspects of SUT 122. In some embodiments, data storage 112 may be located at test system 100, another node, or distributed across multiple platforms or devices.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of CTC 102, CM 108, and NEPRA 110.

Figure 2:
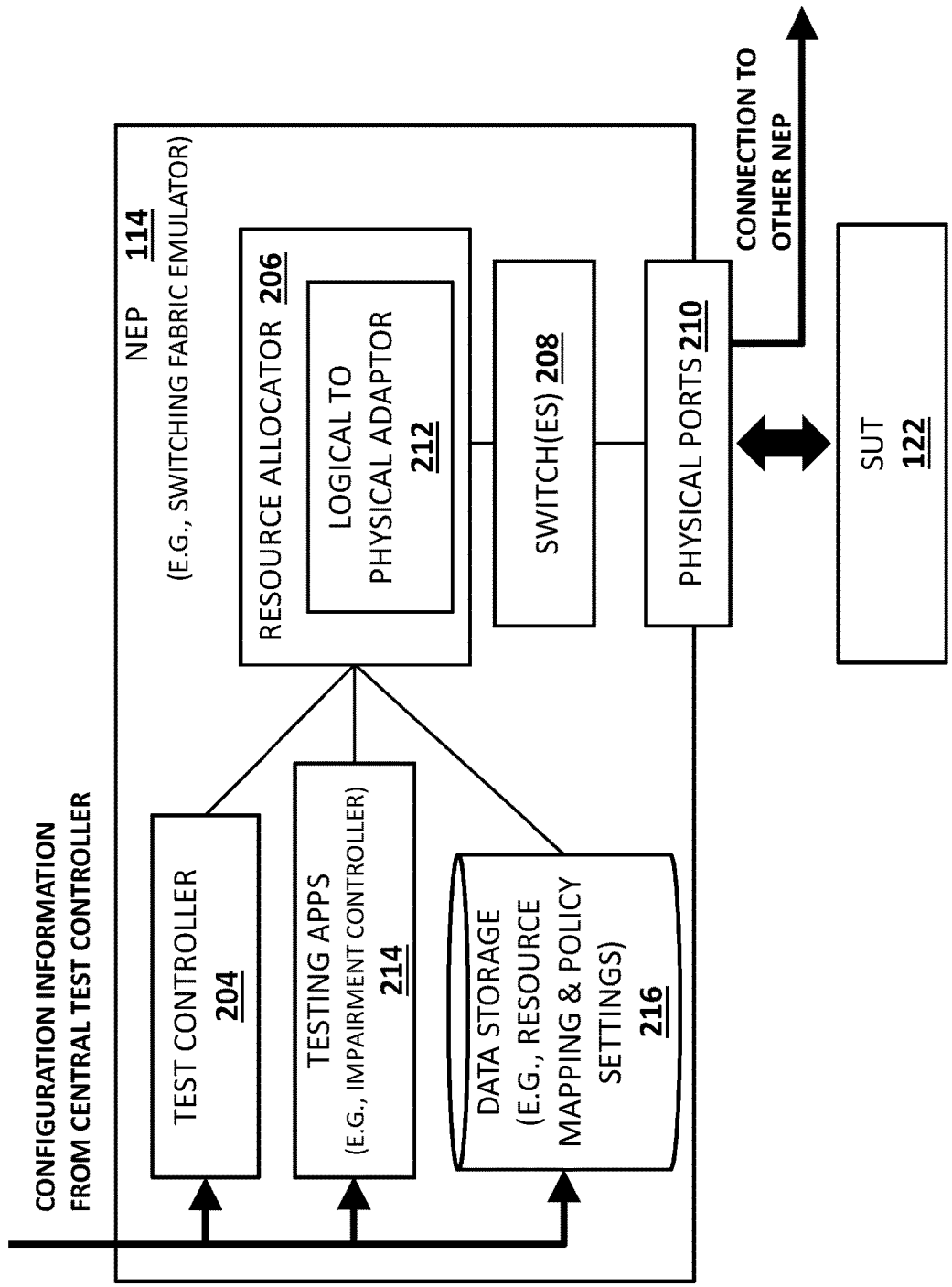
FIG. 2 is a diagram illustrating an example network emulation platform.

FIG. 2 is a diagram illustrating NEP 114. In some embodiments, NEP 114 may include a stand-alone tool, a testing device, a network equipment test device or platform, or software executing on one or more processor(s). In some embodiments, NEP 114 may be a single device or node (e.g., a chassis) and may include one or more modules for emulating a data center or a switching fabric environment and/or may include one or more modules for performing various test related functions associated with the emulated switching fabric environment.

In some embodiments, NEP 114 may be configured to interact with and/or to be configured by CTC 102 or related entities (e.g., CM 108 and/or NEPRA 110). For example, NEP 114, along with other NEPs, may receive particular configuration information from CTC 102 or a related entity via an internal test API. In this example, the configuration information received by NEP 114 may include configuration instructions for configuring NEP 114 or resources therein for use in a testing scenario, e.g., involving one or more test sessions. In another example, the configuration information received by NEP 114 may include test related emulation requirements that are used by NEP 114 or entities therein in generating corresponding or compliant commands or instructions for configuring NEP 114 or resources therein.

NEP 114 may include a test controller (TC) 204, resource allocator (RA) 206, switch(es) 208, ports 210, testing applications 214, and data storage 216. TC 204 may be any suitable entity or entities (e.g., software executing on a processor, an FPGA, and/or an ASIC, or a combination of software, an FPGA, and/or an ASIC) for performing one or more aspects associated with configuring resources in NEP 114 and/or for testing SUT 122. In some embodiments, TC 204 may be implemented using one or more processors and/or memory. For example, TC 204 may utilize one or more processors (e.g., executing software stored in memory) to generate traffic patterns or scenarios for various message streams (e.g., flows or sessions). In another example, TC 204 may also utilize one or more processors to perform or initiate various tests and/or analyses involving test packets and/or related responses from SUT 122. In this example, TC 204 may send instructions to various modules or entities in NEP 114, e.g., testing applications 214 for controlling (e.g., to pause, (re)start, or stop) a test session.

In some embodiments, TC 204 may utilize out-of-band and/or in-band ports and/or interfaces for communicating with entities of NEP 114 or test system 100, e.g., CTC 102. For example, in embodiments where TC 204 is external to RA 206, TC 204 may communicate with RA 206 via a management port or related interface.

In some embodiments, TC 204 may interact with one or more testing applications 214. Testing applications 214 may represent software for testing SUT 122 and/or for performing various test related functions, e.g., performance monitoring, effecting impairments, and test analysis. In some embodiments, testing applications 214 can include, but are not limited to, visibility applications, impairment actuators or controllers, SDN controller applications, GUI and CLI applications, and test traffic generation applications for communicating with SUT 122 and/or an emulated switching fabric environment implemented using switch(es) 208.

In some embodiments, NEP 114 or aspects thereof may be controlled or defined using one or more user-definable data models. For example, CTC 102 may provide a GUI for allowing user 124 to configure or modify a SARA model, a switching model, a switching fabric topology model, a traffic generator model, a network visibility model, etc. used in a testing scenario or a related emulated switching fabric environment. In this example, CTC 102 may send, to TC 204, high-level or user-definable data models indicating a switching fabric topology comprising one or more emulated switches and/or may indicate particular physical resources to allocate to each emulated switch. Continuing with this example, TC 204 or RA 206 may convert these data models into lower-level data models or related computer readable instructions for implementing an emulated switching fabric environment in accordance with the user-definable data models.

In some embodiments, testing applications 214 may include or utilize settings and/or configuration information from CTC 102 or another source (e.g., CIC 109) for setting up an impairment testing scenario or a related test session. For example, received settings and/or configuration information may be usable for generating and impairing relevant test traffic (e.g., traffic flows). In another example, received settings and/or configuration information may be usable for instructing visibility infrastructure components for monitoring traffic and/or performance aspects associated with a testing scenario or a related emulated switching fabric environment.

In some embodiments, testing applications 214 may include or utilize a traffic generator. For example, a traffic generator may be any suitable entity or entities (e.g., software executing on a processor, an ASIC, an FPGA, or a combination of software, an ASIC, or an FPGA) for performing one or more aspects associated with generating or synthesizing test sessions, test sessions, or related test packets. In this example, the traffic generator may be configured to utilize user input and predefined test session templates or related data to generate one or more test sessions and/or test sessions.

In some embodiments, a traffic generator may generate test traffic that is directed to traverse emulated logical switches or an emulated switching fabric environment. The emulated switching fabric environment may be configured so as to emulate a particular switching fabric or topology. In some embodiments, a traffic generator may include one or more test traffic receivers (e.g., test receive ports) that are configured to receive the test traffic and generate test metric information, which may be accessible to a visibility module of test system 100.

In some embodiments, test traffic may transit the emulated switching fabric environment without being received or transiting SUT 122. For example, user 124 may specify, via CM 108, levels and types of background traffic that can be generated on some or all of the NEPs associated with a particular testing scenario or session. For example, some or all of this test traffic can be configured to transit the emulated switching fabric environment (but not SUT 122) during the execution of a test session involving SUT 122. In another example, some or all of this test traffic can be configured to transit SUT 122 during execution of a test session.

In some embodiments, testing applications 214 may include or utilize an impairment actuator or controller (e.g., software executing on a processor, an FPGA, and/or an ASIC, or a combination of software, an FPGA, and/or an ASIC) for performing one or more aspects associated with controlling, generating, or effecting one or more impairments of a testing environment during a test session. In such embodiments, the impairment controller (e.g., logic or software executed by one or more processors) may be configurable by TC 204 or CIC 109 via an API or other interface. For example, impairment controller of NEP 114 may impair various aspects of emulated switching fabric environment 300, e.g., emulated switches and routing logic that are implemented using physical resources of NEP 114. In another example, impairment controller of NEP 114 may impair traffic generation or related behavior by affecting a traffic generator implemented using physical resources of NEP 114.

An example impairment may include adjusting traffic quality of service (QoS) settings, e.g., traffic queue sizes, policing, and/or traffic shaping. For example, during a test session, impairment controller of NEP 116 may configure a traffic policer to increase or decrease bandwidth for certain traffic and measure effect on test system related SLIs and SUT related SLI.

Another example impairment may include adjusting background traffic generator settings. For example, during a test session, impairment controller of NEP 118 may configure a traffic generator to increase a transmit rate of certain traffic flows to fill up egress queues completely or to a particular percentage of capacity. In another example, impairment controller of NEP 118 may inject traffic shaping at specific egress queues of switch(es) 208 to simulate delays and build up buffers without causing additional traffic generation.

Another example impairment may include adjusting traffic oversubscription. For example, during a test session, impairment controller of NEP 114 may modify or cause to be modified (e.g., increase or decrease) a number of links or an amount of bandwidth between emulated switches, e.g., between emulated spine switches, emulated pod switches, or top of rack (ToR) switches.

Another example impairment may include adjusting link or route availabilities. For example, during a test session, impairment controller of NEP 116 may drop nodes or links between nodes, such as by completely or partially knocking out an emulated switch (e.g., a pod switch (e.g., PODSW 312) or a spine switch (SPSW 314)) of emulated switching fabric environment 300 by removing specific configurations from an underlying switching ASIC, thus impacting and create available paths. In another example, during a test session, impairment controller of NEP 118 may remove links from equal-cost multi-path routing (ECMP) groups within an emulated switching fabric environment or may create blackholes by removing routes from certain hops in the emulated switching fabric environment.

In some embodiments, one or more impairments may be effected in a repeatable but pseudo-random fashion. For example, during a test session, impairment controller of NEP 114 may cause an emulated switching fabric environment of a testing environment to have a 90% utilization. In this example, load on individual links that contribute to that 90% may be pseudo-random and/or changing.

In some embodiments, testing applications 214 may include or utilize a visibility module and/or a related analyzer. In such embodiments, the visibility module and/or the related analyzer may be configurable by TC 204 for monitoring performance or telemetry information in a particular emulated switching fabric environment or topology. For example, a visibility module may be any suitable entity or entities (e.g., software executing on a processor, an ASIC, an FPGA, or a combination of software, an ASIC, or an FPGA) for maintaining network visibility (e.g., using virtual or physical probes or network taps). In this example, virtual taps or software may be configured to provide switch metrics or other information (e.g., network telemetry, switch and/or link status information, etc.) associated with one or more elements (e.g., emulated switches) of an emulated switching fabric environment. Continuing with this example, the visibility module may generate performance reports or test analysis reports associated with SUT 122, e.g., by utilizing the switch metrics or other information associated with packets that pass through or are generated by SUT 122.

In some embodiments, a visibility module may be configured for obtaining emulated logical switch performance metric information associated with a test session by polling RA 206 or another test system entity. For example, by polling for logical switch performance metric information associated with a test session, user 124 may observe how the operation of SUT 122 impacts the emulated switching fabric environment during a test. Polling logical switch performance metric information associated with a test session may also be used for observing how conditions (e.g., background traffic levels) in the emulated switching fabric environment impact the DUT/SUT during a test.

In some embodiments, a visibility module is adapted to obtain or generate telemetry or operational performance data associated with the emulated switches during the execution of a test session involving SUT 122. In such embodiments, the visibility module may correlate the telemetry or operational performance data with SUT endpoint operational activities and events (e.g., SUT operational actions as defined in a test session) and may report performance data and/or correlated SUT endpoint information to user 124.

Switch(es) 208 may represent one or more switch processors (e.g., a switching ASIC, a system on a chip (SoC), custom hardware, an FPGA, a software switch, etc.) and may include additional hardware, firmware, and/or software for performing one or more functions associated with network switching. For example, switch(es) 208 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, traffic manager logical queues, etc.) of switch(es) 208 may be managed and/or allocated to provide emulated switches by RA 206.

Ports 210 may include or utilize any suitable entity or entities (e.g., one or more network interface cards (NICs), pluggable jacks, physical processors, transceiver modules, direct-attach cables (DACs) and/or other hardware) for sending or receiving communications. For example, TC 204 or RA 206 may configure one or more of ports 210 (e.g., physical connections) for receiving and sending various types of test packets or related data units; such as IP messages, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 210 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 210 may include multiple port modules or groups of ports for interacting with SUT 122. For example, depending on a test operator's configuration settings or a particular test session setup, RA 206 may allocate a portion of physical resources to each switch that is emulated, where the emulated switches are collectively used to mimic a data center switching fabric. In some embodiments, each emulated switch may be allocated or associated with one or more of ports 210 and the port association may be static or semi-static (e.g., particular ports may be assigned to an emulated switch for a given test session).

RA 206 may be any suitable entity or entities (e.g., software executing on a processor, an FPGA, an ASIC, or a combination of software, an FPGA, and/or an ASIC) for performing one or more aspects associated with allocating resources to emulated switches and/or managing emulated switches. In some embodiments, RA 206 may allocate and manage resources of switch(es) 208 for providing emulated switches without requiring a custom ASIC pipeline. In some embodiments, RA 206 can be external or internal to switch(es) 208.

In some embodiments, RA 206 may utilize one or more management ports or related interfaces for communicating with a controller or related applications (e.g., CTC 102, TC 204 and/or testing applications 214) and/or for communicating with switch(es) 208. For example, TC 204 or a related application may communicate with RA 206 via an out-of-band management port or related interface. In this example, RA 206 may send instructions or other communications to switch(es) 208 via another management port or related interface.

In some embodiments, RA 206 may include a logical to physical adaptor 212. Logical to physical adaptor 212 may be any suitable entity or entities (e.g., software executing on a processor, an FPGA, an ASIC, or a combination of software, an FPGA, and/or an ASIC) for converting and/or translating communications to refer to logical (e.g., virtual) or physical resources depending on the destination. For example, when requesting information about available switching resources via RA 206, testing applications 214 and/or SUT 122 may "see" a set of emulated switches each with a subset of resources instead of switch(es) 208. In this example, logical to physical adaptor 212 may translate information about logical resources into information about physical resources of a single switch (e.g., Tomahawk 3) and vice versa so that interacting nodes may remain unaware of the underlying switch(es) 208 or related switch resources.

In some embodiments, RA 206 and/or logical to physical adaptor 212 may reside between a native device interface and interacting entities (e.g., SUT 122, testing applications 214, or external devices) and may act as a communications proxy or agent using a logical interface. For example, SUT 122 may include a network switch controller that configures switching resources by sending, via a logical interface associated with RA 206, configuration requests for requesting and/or configuring one or more switches. In this example, RA 206 and/or logical to physical adaptor 212 may translate the configuration requests received via the logical interface into one or more corresponding requests for transmission via a native switch interface, where the corresponding requests include commands for configuring appropriate physical resources of underlying switch(es) 208. Further, RA 206 and/or logical to physical adaptor 212 may translate switch performance results coming from a native switch interface into virtualized results (e.g., link status or counter values for a physical port '60' may be changed to values for a logical port 'v1' on an emulated switch 'TORSW1') before sending the virtualized results to the network switch controller via the logical interface.

In some embodiments, RA 206 and/or logical to physical adaptor 212 may create, store, and/or use switching ASIC emulation data (e.g., physical to logical port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 216, logical ports 'v1', 'v2', 'v3' on an emulated switch 'TORSW1' may be translated into physical ports '60', '61', '62', respectively. In this example, configuration commands for setting speed of port 'v1' can be translated so that the speed of corresponding physical port '60' is set. Continuing with this example, to query the statistical counters for logical port 'v1' the statistical counters for physical port '60' may be queried.

In some embodiments, RA 206 and/or logical to physical adaptor 212 may utilize a modified proprietary (e.g., vendor) API (e.g., a vendor's software development kit (SDK) or by utilizing a wrapper API that interacts with a vendor API. For example, by using a wrapper API, RA 206 can manage a fleet of emulated switches using off-the-shelf or commodity ASICs with NOSes that utilize a proprietary or vendor API.

In some embodiments, RA 206 and/or logical to physical adaptor 212 may utilize a custom adaptor that handles certain applications or functions which may involve a subset of resource management and mapping requirements than a standard switching API. For example, by using a custom adaptor, RA 206 can manage a fleet of emulated switches for certain use cases using off-the-shelf or commodity ASICs.

In some embodiments, NEP 114 or entities thereof (e.g., TC 204, testing applications 214, and/or RA 206) may include functionality for accessing data storage 216. Data storage 216 may be any suitable entity or entities (e.g., a storage device, a non-transitory computer readable medium, or a storage system) for maintaining or storing information related to switching ASIC emulation, network testing, or related test analysis. For example, data storage 216 may include switching ASIC emulation data (e.g., physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 216 may also include test traffic models, test sessions, test session data, topology information for emulated switching fabric environments, information usable for generating performance metrics (e.g., statistics) associated with one or more aspects of SUT 122, and/or other information associated with testing SUT 122. In some embodiments, data storage 216 may be located at NEP 114, another node, or distributed across multiple platforms or devices.

It will be appreciated that FIG. 2 is for illustrative purposes and that various depicted entities, their locations, and/or their functions described above in relation to FIG. 2 may be changed, altered, added, or removed. For example, NEP 114 may include a chassis or rack including one or more computers (e.g., blade computers) each including at least one processor coupled to a memory, e.g., data storage 216. In this example, each server may include functionality of TC 204, RA 206, and/or testing applications 214.

Figure 3:
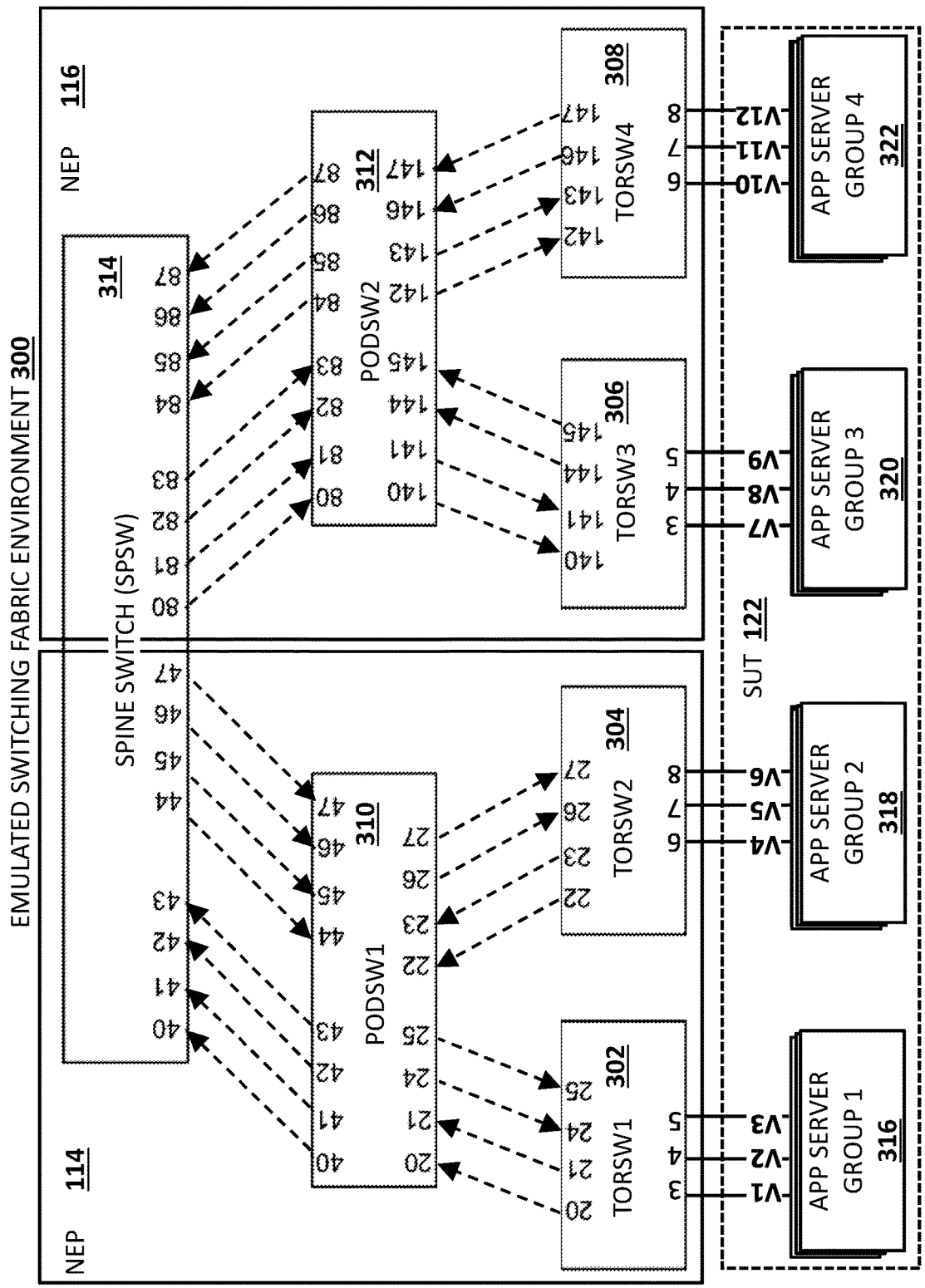
FIG. 3 is a diagram illustrating an example emulated switching fabric environment usable for network testing.

FIG. 3 is a diagram illustrating an example emulated switching fabric environment 300 usable for network testing. Emulated switching fabric environment 300 may represent a switching fabric comprising a network of emulated switches for forwarding packets from or to SUT 122 or other entities, where the emulated switches may be connected via a particular (e.g., user-defined) logical topology. For example, emulated switching fabric environment 300 may be implemented using resources (e.g., switches 208) of NEPs 114 and 116 and configured based on user input and/or predetermined environment templates or data models, e.g., stored in data storage 216.

In some embodiments, e.g., where emulated switching fabric environment 300 uses multiple NEPs (e.g., NEPs 114 and 116), physical connections or links may be used for communicatively connecting NEPs or physical resources therein. For example, each of NEPs 114-118 may use one or more of its physical ports 210 for interconnecting or linking with other NEPs, e.g., via 40 G or 100 G links. In another example, each of NEPs 114-118 may be communicatively connected via wireless transceivers.

Referring to FIG. 3, emulated switching fabric environment 300 may represent a 3-stage Clos switching network comprising different stages of emulated switches, wherein each emulated switch is implemented using physical resources of NEP 114 and/or 116. As depicted, stage one switches of emulated switching fabric environment 300 include top of rack switches (TORSWs) 302 and 304 implemented using NEP 114 and TORSWs 306 and 308 implemented using NEP 116. Stage two switches of emulated switching fabric environment 300 include cluster or pod switch (PODSW) 310 implemented using NEP 114 and PODSW 312 implemented using NEP 116. Stage three of emulated switching fabric environment 300 include a spine switch (SPSW) 314 implemented using both NEP 114 and 116. In some embodiments, TORSWs 302-308 may represent or emulate switches that are connected to multiple servers (e.g., located within a rack or nearby rack), PODSWs 310-312 may each represent or emulate an aggregation switch that is connected to multiple TORSWs, and SPSW 314 may represent or emulate a higher-level aggregation switch that is connected to multiple PODSWs.

In some embodiments, characteristics (e.g., bandwidth, supported protocols, or processing speed or throughput) of emulated switches may be varied as defined by test configuration information or related settings. For example, each of NEPs 114 and 116 may include a different brand, type, and/or version of switches 108 and/or other hardware. In this example, depending on user input and/or configuration information, NEPRA 110 may indicate which NEP is to emulate which emulated switches based on NEP capabilities and user requirements for emulated switching fabric environment 300.

In some embodiments, some physical ports of switch(es) 208 of NEPs 114 and 116 may be associated with different emulated switches and may utilize loopback interfaces or internal interfaces for emulating communications between some emulated switches, while other emulated switches (e.g., TORSWs 302-308) may utilize physical interfaces and/or physical cabling for communicating with SUT 122 or portions thereof.

In some embodiments, SUT 122 may represent or include a set of application server groups 316-322, each representing one or more servers and/or applications. For example, application server group 1 316 may include multiple servers (e.g., 16 or more servers in a single rack), each having one or more connections to a TOR switch. In some examples, a server of application server groups 316-322 may include multiple applications or perform different services (e.g., machine learning (M/L), storage offload, search engines, webpages, video streaming, email, etc.) for users or may perform similar services for different sets of users. In some examples, a server of application server groups 316-322 may act as a client to another server.

In some embodiments, each of application server groups 316-322 may be connected (e.g., physically cabled) to a different set of physical ports 210 of switch(es) 208 in NEP 114 or NEP 116, where each set of physical ports 210 is assigned or allocated to a particular emulated switch. For example, RA 206 of a respective NEP may assign physical ports '60', '61', and 62' to an emulated switch 'TORSW1' and may virtualize those physical ports as 'v1', 'v2', and 'v3', respectively. In this example, applications and/or servers in application server group 1 316 may be communicatively coupled to one or more of the logical ports of the emulated switch 'TORSW1'.

It will be appreciated that FIG. 3 is for illustrative purposes and that various depicted entities, their locations, and/or their functions described above in relation to FIG. 3 may be changed, altered, added, or removed.

FIG. 4 is a diagram illustrating example data center topology configuration information 400. In some embodiments, configuration information 400 or portions or variations thereof may be accessed and/or stored by CTC 102, NEPRA 110, CM 108 using one or more data structures or storage devices (e.g., data storage 112). In some embodiments, configuration information 400 or portions or variations thereof may be accessed and/or stored by TC 204 and/or RA 206 of one or more of NEPs 114-118 using one or more data structures or storage devices (e.g., data storage 112).

In some embodiments, configuration information 400 may include any suitable information for mapping logical ports associated with emulated switching fabric environment 300 to physical ports of switch(es) 208 in one of NEPs 114-118. In some embodiments, configuration information 400 may be stored or maintained in data storage 216 and may be usable for translating port information or related information in switch configuration commands, performance metrics, and/or other communications.

Referring to FIG. 4, configuration information 400 may be depicted using a table representing associations between a topology identifier (TID) and a corresponding topology description. In some embodiments, a TID may include any suitable identifier, such as one or more numbers or values, usable for identifying a switching topology or a related emulated switching fabric environment. For example, each switching topology or emulated switching fabric environment provided by user 124 or stored for testing may have a different, unique TID, e.g., 1, 2, 3, and 4, respectively.

In some embodiments, a topology description may include information for describing or defining a switching topology associated with an emulated switching fabric environment, e.g., emulated switching fabric environment 300. For example, a topology description may indicate the type of switching topology including the number of NEPs used for implementation, the number of switch stages, the types and number of emulated switches and ports at each stage, along with various characteristics (e.g., port speeds, link speeds, forwarding rules, throughput limits, etc.) that can be used to emulate or virtualize the switching fabric environment described.

It will be appreciated that configuration information 400 in FIG. 4 is for illustrative purposes and that different and/or additional information may also be stored or maintained. Further, it will be appreciated that configuration information 400 may be stored in various data structures, memories, media, and/or in one or more locations.

FIG. 5 is a diagram illustrating example port mapping data 500 for mapping logical ports of emulated switches (e.g., TORSWs 302-308) to physical ports of switch(es) 208 in one of NEPs 114-118. In some embodiments, port mapping data 500 or portions or variations thereof may be accessed and/or stored by CTC 102, NEPRA 110, CM 108 using one or more data structures or storage devices (e.g., data storage 112). In some embodiments, port mapping data 500 or portions or variations thereof may be accessed and/or stored by TC 204 and/or RA 206 of one or more of NEPs 114-118 using one or more data structures or storage devices (e.g., data storage 112).

In some embodiments, port mapping data 500 may include any suitable information for mapping logical ports associated with emulated switching fabric environment 300 to physical ports of switch(es) 208 in one of NEPs 114-118. In some embodiments, port mapping data 500 may be stored or maintained in data storage 216 and may be usable for translating port information or related information in switch configuration commands, performance metrics, and/or other communications.

Referring to FIG. 5, port mapping data 500 may be depicted using a table representing associations between logical port information and physical port information. For example, each row or association may include a topology identifier (TID), an NEP ID, an emulated switch identifier (ESID), a logical port number, a physical switch identifier (PSID), and a physical port number.

In some embodiments, a TID may include any suitable identifier, such as one or more numbers or values, usable for identifying a switching topology or emulated switching fabric environment 300. For example, a test operator may select a 3-stage Clos network environment with particular characteristics to emulate for a first test session, a 3-stage Clos network environment with different characteristics to emulate for a second test session, a 5-stage Clos network environment with particular characteristics to emulate for a third test session, and a 7-stage Clos network environment with particular characteristics to emulate for a fourth test session. In this example, each switching topology or emulated switching fabric environment may have a different, unique TID, e.g., 1, 2, 3, and 4, respectively.

In some embodiments, a NEP ID may include any suitable identifier, such as one or more numbers or values, usable for identifying a NEP. For example, NEPs 114-118 may each have a unique name and/or number, e.g., 'NEP1', '345AR324T', 'N-1', etc. In some embodiments, NEP IDs may be unique within a test system or emulated switching fabric environment 300. In some embodiments, NEP IDs may be unique amongst multiple (or even all) NEPs controlled by an operator or service provider.

In some embodiments, an ESID may include any suitable identifier, such as one or more numbers or values, usable for identifying an emulated switch. For example, emulated switching fabric environment 300 may have seven emulated switches, each switch having a unique name and/or number, e.g., 'TORSW1', 'A', '234553242', etc. In some embodiments, ESIDs may be unique within a topology or emulated switching fabric environment 300. In some embodiments, ESID may be unique amongst multiple (or even all) defined topologies or emulated switching fabric environments.

In some embodiments, a logical port number may include any suitable identifier, such as one or more numbers or values, usable for identifying a port of an emulated switch. For example, an emulated switch 'PODSW1' of emulated switching fabric environment 300 may have multiple logical ports, each having a unique name and/or number at least within that emulated switch, e.g., 'v1', 'v2', 'v3', etc. In some embodiments, logical port numbers may be unique within a topology or an emulated switching fabric environment. In some embodiments, logical port numbers may be unique amongst multiple (or even all) defined topologies or emulated switching fabric environments.

In some embodiments, a PSID may include any suitable identifier, such as one or more numbers or values, usable for identifying a physical switch, e.g., switch(es) 208. For example, NEPs 114-118 may each have one or two switches 208, each switch having a unique name and/or number, e.g., 'SW1', 'A', '234553242', etc. In some embodiments, PSIDs may be unique within a test system or a emulated switching fabric environment. In some embodiments, PSIDs may be unique amongst multiple (or even all) NEPs controlled by an operator or service provider.

In some embodiments, a physical port number may include any suitable identifier, such as one or more numbers or values, usable for identifying a port of switch 208. For example, each switch 208 may have multiple physical traffic ports, each having a unique name and/or number at least within each physical switch, e.g., '60', '61', '62', etc. In some embodiments, physical port numbers may be unique within each of switches 208. In some embodiments, physical port numbers may be unique amongst multiple (or even all) switch(es) 208, e.g., used in emulated switching fabric environment 300.

In some embodiments, (e.g., where multiple switching topologies are stored in a data structure), a TID, a NEP ID, an ESID, and a logical port number may be used as a combination lookup key or value for identifying a corresponding NEP, physical switch, and physical port. In some embodiments, e.g., where one topology is stored in a data structure, a NEP ID, an ESID, and a logical port number may be used as a combination key or value for identifying a corresponding NEP, physical switch, and physical port. In some embodiments, e.g., where each logical port number is unique in an emulated switching fabric environment 300, a logical port number may be used as a lookup key or value for identifying a corresponding NEP, physical switch, and physical port.

It will be appreciated that port mapping data 500 in FIG. 5 is for illustrative purposes and that different and/or additional information may also be stored or maintained. Further, it will be appreciated that port mapping data 500 or related data may be stored in various data structures, memories, media, and/or in one or more locations.

FIG. 6 is a diagram illustrating example testing environment target state information 600 for a test session. Testing environment target state information 600 may represent information usable for indicating a target state for a testing environment or a related aspect, e.g., SUT 122 and/or emulated switching fabric environment 300. For example, testing environment target state information 600 may include one or more definitions indicating values for a number of monitored metrics associated with the testing environment.

In some embodiments, testing environment state information 600 may be provided or selected when configuring a testing environment or related testing. For example, user 124 may use UI(s) 104 to select or configure testing environment state information 600 such that during a test session a number of SUT and/or emulated switching fabric (ESF) metrics can be monitored and analyzed for determining whether a desired or target state has been reached.

In some embodiments, testing environment target state information 600 may include information for identifying or recognizing performance states, e.g., good states and bad states related to testing environment or aspects thereof, e.g., SUT performance or emulated switching fabric (ESF) performance. For example, using a test provisioning interface (e.g., UI(s) 104), user 124 may define or specify a high-level or abstract functional target state (e.g., based on observable performance metric values) of a testing environment or aspect thereof (e.g., SUT 122 or emulated switching fabric environment 300). In this example, the target state of a testing environment may be represented by one or more SUT or ESF performance metrics (e.g., service level indicators (SLIs)) and associated target state values or thresholds for those metrics.

In some embodiments, testing environment target state information 600 may include 'good' state criteria for defining acceptable or good SUT or ESF performance. For example, 'good' state criteria or definition may represent values of one or more metrics that are indicative of acceptable performance. In this example, metrics 'X' and 'Y' from a catalog of available metrics (e.g., SLI metrics) that are visible to obtainable by test system 100 during a test session or a set of test sessions, e.g., SUT metrics may be obtained from SUT visibility tool 126 or other entities and ESF metrics may be obtained from visibility nodes or modules in test system 100.

In some embodiments, testing environment target state information 600 may include tad' state criteria for defining unacceptable or bad SUT or ESF performance. For example, tad' state criteria or definition may represent values of one or more metrics that are indicative of unacceptable performance. In this example, metrics 'A' and 'B' from a catalog of available metrics (e.g., SLI metrics) that are visible to or obtainable by test system 100 during a test session or a set of test sessions, e.g., SUT metrics may be obtained from SUT visibility tool 126 or other entities and ESF metrics may be obtained from visibility nodes or modules in test system 100.

In some embodiments, performance state criteria or definitions may utilize conditional expressions and/or other logic (e.g., Boolean logic) to identify a particular state. In some embodiments, user 124 may specifies conditional expressions associated with selected metrics, which define performance state category associations for the testing environment or aspects thereof, e.g., SUT 122 or emulated switching fabric environment 300. For example, a fabric-related metric value above a pre-defined threshold value is interpreted during execution of the test session as being indicative of 'good' fabric performance state, while the same metric equal to or below the threshold value is interpreted during execution of the test session as being indicative of tad' fabric performance state.

As depicted in FIG. 6, example 'good' state criteria for defining or identifying for good or acceptable SUT performance may refer to a SUT visibility metric 'X' (e.g., 'X'=response latency) and a SUT visibility metric 'A' (e.g., 'A'=error status), where if 'X'<='value' (e.g., 'value'=300 milliseconds 99% of time) and if A' 'value2' (e.g., 'value2'='NO'), then SUT performance is considered 'good'. Example 'bad' state criteria for defining or identifying for bad or unacceptable SUT performance may refer to a SUT visibility's metric 'X' (e.g., 'X'=response latency) and a SUT visibility's metric 'A' (e.g., 'A'=error status), where if 'X'>'value' (e.g., 'value'=300 milliseconds 99% of time) or if 'A'=='value2' (e.g., 'value2'='YES'), then SUT performance is considered 'bad'.

As depicted in FIG. 6, example 'good' state criteria for defining or identifying for good or acceptable ESF performance may refer to an ESF visibility metric 'Z' (e.g., 'Z'=packet drops), where if 'Z'<'value3' (e.g., 'value3'=2%), then ESF performance is considered 'good', else ESF performance is considered 'bad'.

In some embodiments, e.g., as shown in FIG. 6, state criteria or definitions can include multiple metrics and may involve logic or expressions that are multifaceted or combinational. For example, conditional expressions can be greater than (>), greater than or equal to (>=), less than (<), less than or equal to (<=), equal to (==), not equal to (!=), contains and multiple conditional expressions can be combined, e.g., using Boolean logic.

In some embodiments, e.g., in lieu of or in addition to performance state criteria or definitions, testing environment target state information 600 may include information representing impairments scenarios to be applied during a test session involving a given testing environment. For example, impairment scenarios may be predefined and selectable (e.g., from a list of available impairment scenarios) by user 124. In this example, each impairment scenario may indicate or represent one or more state criteria or definitions and/or one or more impairment generation rules usable for one or more test sessions. Continuing with this example, test system 100 or a related entity (e.g., an impairment controller may utilize or adjust various settings or parameters until an impairment scenario (or related criteria) is realized or a stop condition is met.

Example impairment scenarios may include a fabric fault tolerance impairment scenario, a fabric grey failure impairment scenario, and/or a fabric crash impairment scenario. A fabric fault tolerance impairment scenario may represent an impairment (or set of impairments) that affect the testing environment such that visibility metrics indicate that emulated switching fabric environment 300 is in a 'bad' state and that SUT 122 is in a 'good' state. For example, a fabric fault tolerance impairment scenario may occur when SUT visibility tool 126 observes a response latency metric of 300 milliseconds 99% of time (assuming that SUT 122 is in a 'good' state when the response latency metric is less than or equal to 300 milliseconds 99% of time), and when NEP visibility module or another entity observes that a fabric availability metric is 50% (assuming that emulated switching fabric environment 300 is in a 'bad' state when the fabric availability metric is less than 75%).

A fabric gray failure impairment scenario may represent an impairment (or set of impairments) that affect the testing environment such that visibility metrics indicate that emulated switching fabric environment 300 is in a 'good' state and that SUT 122 is in a 'bad' state. For example, a fabric gray failure impairment scenario may occur when SUT visibility tool 126 observes a response latency metric of 350 milliseconds 99% of time (assuming that SUT 122 is in a 'bad' state when the response latency metric is greater 300 milliseconds 99% of time), and when NEP visibility module or another entity observes that a packet loss metric is less than 1% over a period of time (assuming that emulated switching fabric environment 300 is in a 'good' state when the packet loss metric is less than 1% over that period of time).

A fabric crash impairment scenario may represent an impairment (or set of impairments) that affect the testing environment such that visibility metrics indicate that emulated switching fabric environment 300 and SUT 122 are both in 'bad' states. For example, a fabric crash impairment scenario may occur when SUT visibility tool 126 and NEP visibility module or another entity both observe metrics indicating 'bad' states, e.g., when packets associated with a set of routes between two end hosts connected via a top of rack switch are blackholed or dropped.

It will be appreciated that testing environment target state information 600 in FIG. 6 is for illustrative purposes and that different and/or additional information may also be stored or maintained. Further, it will be appreciated that testing environment target state information 600 or related data may be stored in various data structures, memories, media, and/or in one or more locations.

Figure 7:
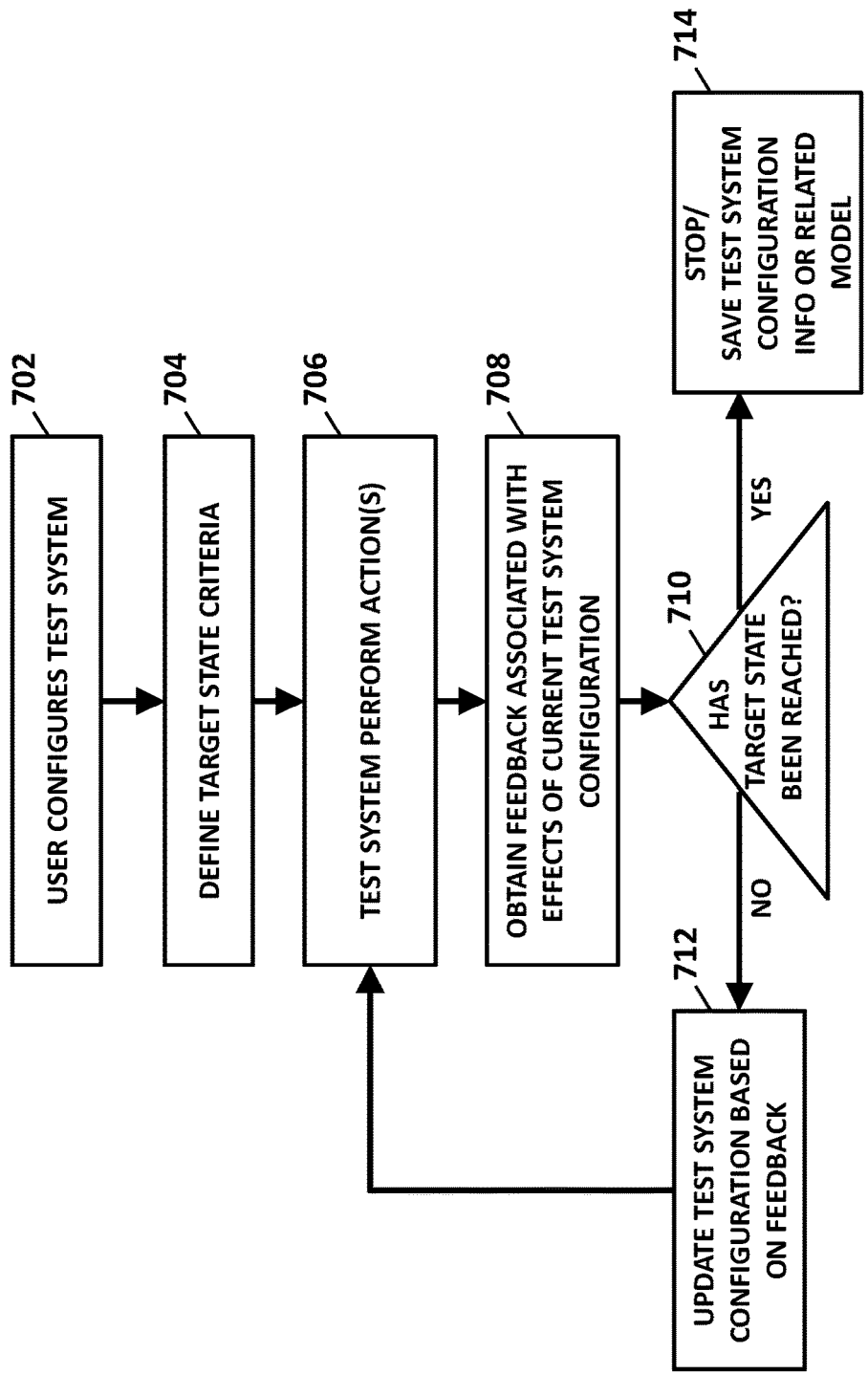
FIG. 7 is a diagram illustrating an example calibration phase for impairment testing.

FIG. 7 is a diagram illustrating an example calibration phase 700 for impairment testing. In some embodiments, test system 100 may be configured for executing test sessions that involve impairing one or more aspects of a testing environment (e.g., SUT 122 and/or emulated switching fabric environment 300) and/or for achieving or seeking one or more target states, e.g., as defined by criteria (e.g., target state definition information) selected or inputted by user 124.

In some embodiments, e.g., depending on the complexity of the target state definition specified by the user and/or the testing environment, scanning or evaluating an overall impairment space (e.g., determining how to effect or apply one or more impairments) associated with a test session may be time and resource intensive. For example, a brute force approach to scanning or evaluating an impairment space may involve a serial execution of multiple test sessions (also referred to as experiments) based on a random selection of available impairment sources and associated impairment parameter values. With such an approach, eventually, a combination of impairment sources and associated impairment parameter values may be observed that effectively drives the testing environment to converge on a desired target state. Depending on the approach and the complexity of the testing environment, sometimes reaching a target state may require many experiments over a long duration, e.g., several hours or days.

In some embodiments, test system 100 or a related entity may utilize calibration phase 700 prior to one or more test sessions or related usage. For example, calibration phase 700 may be usable for obtaining an acceptable model (e.g., a set of impairment generation rules or related logic) for impairing a particular testing environment. In this example, the model can then be used (e.g., by impairment controllers or related entities) to implement various impairments and/or seek desired or target states efficiently we propose to have a calibration phase before actual daily use After an acceptable model is generated by calibration phase 700, user 124 can execute additional test sessions for tweaking or optimizing for particular tasks. In some embodiments, training data (e.g., parameters values used in calibration phase 700) may be useful in providing recommendations for network operators on what metrics to monitor to maintain certain service level objectives (SLOs) for various applications and/or tasks.

In some embodiments, test system 100 or a related entity may save or store a calibrated model or other information from calibration phase 700. For example, user 124 may configure test system 100 to perform calibration phase 700 and save test system configuration state information (e.g., impairment source and parameter settings) that can lead to convergence of one or more target states. In this example, test system configuration state information may be usable to effectively provide an established calibration point for the testing environment (e.g., SUT 122 and/or emulated switching fabric environment 300) with respect to a particular target state. Continuing with this example, test system 100 may use this calibration information to provide CIC 109 and/or testing applications 214 (e.g., an impairment actuator or controller) with precise initial conditions during subsequent executions of the same test session, which may lead to better overall testing environment performance or faster convergence.

Referring to calibration phase 700, in step 702, user 124 configures test system 100 using an initial test system configuration. For example, test system 100 may be configured with a set of initial parameter values or settings for calibration experimentation involving a testing environment.

In step 704, target state criteria (e.g., testing environment target state information 600) may be defined for calibration phase 700.

In step 706, test system 100 may perform one or more actions for achieving or attempting to achieve a target state. For example, test system 100 may perform a series of test sessions with different combinations of parameter values of settings. In this example, step 706 may be part of an iterative process associated with a control feedback loop, where feedback is based on monitored performance metrics.

In step 708, feedback associated with effects of the current test system configuration may be obtained and analyzed by test system 100 or a related entity. For example, SUT visibility tool 126 and/or visibility applications of test system 100 may provide service level indicator (SLI) metrics to CIC 109 or a related entity, where the SLI metrics can be analyzed to determined whether a target state has been reached or a stop condition has been met.

In step 710, it may be determined whether a target state has been reached. If a target state has been reached or a stop condition has been met, step 714 may occur or additional experimenting may be performed if additional target states are to be reached. If a target state is not reached, step 712 may occur.

In step 712, the test system configuration may be adjusted or updated based on obtained feedback. For example, CIC 109 or a related entity may use visibility information or related metrics to generate an error signal or related instructions for adjusting a test system configuration in effort to achieve a target state.

In step 714, calibration phase 700 may be stopped and test system calibration information or a related model may be stored for later testing or other usages.

It will be appreciated that calibration phase 700 in FIG. 7 is for illustrative purposes and that different and/or additional steps or operations may be performed for generating a calibrated model or related instructions usable for adjusting a testing environment to achieve various target states.

Figure 8:
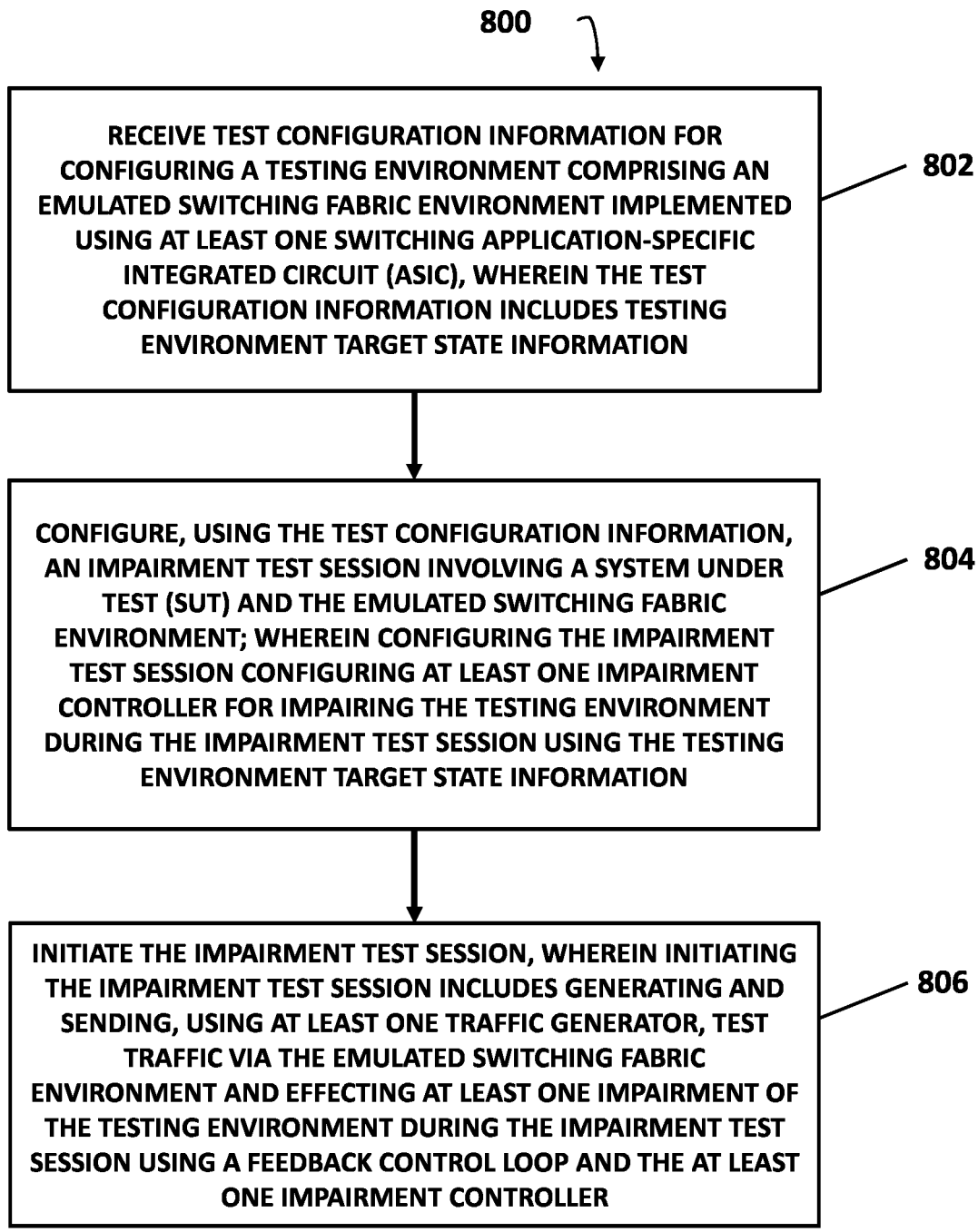
FIG. 8 is a diagram illustrating an example process for impairment testing using an emulated switching fabric environment.

FIG. 8 is a diagram illustrating an example process 800 for impairment testing using an emulated switching fabric environment. In some embodiments, process 800, or portions thereof, may be performed by or at test system 100, CTC 102, CIC 109, CM 108, NEPRA 110, one or more of NEPs 114-118, testing applications 214 (e.g., an impairment controller or module), and/or another node or module. In some embodiments, process 800 may include steps 802-806.

Referring to process 800, in step 802, test configuration information may be received. The test configuration information may be for configuring a testing environment comprising an emulated switching fabric environment (e.g., emulated switching fabric environment 300) implemented using at least one switching ASIC (e.g., switch(es) 208), wherein the test configuration information includes testing environment target state information.

In some embodiments, receiving configuration information may include providing a user interface for defining an emulated switching fabric environment involving the emulated switches.

In some embodiments, receiving configuration information may include providing a user interface for defining or receiving testing environment target state information, e.g., testing environment target state information 600. For example, testing environment target state information may include a SUT target state definition indicating acceptable SUT performance metric information and/or an emulated switching fabric environment target state definition indicating acceptable emulated switching fabric environment performance metric information.

In step 804, an impairment test session involving a SUT (e.g., SUT 122) and the emulated switching fabric environment (e.g., emulated switching fabric environment 300) may be configured. Configuring the impairment test session may include configuring at least one impairment controller (e.g., CIC 109 and/or testing applications 214) for impairing the testing environment during the impairment test session using the testing environment target state information. For example, CIC 109 may use a set of impairment generation rules indicating which impairments (and to what extent) are deployed or implemented during a test session for affecting behavior of SUT 122 and/or emulated switching fabric environment 300 in an attempt to achieve or reach a target state indicated by user-specified testing environment target state information.

In some embodiments, configuring an impairment test session may include instructions for configuring network visibility infrastructure components associated with a testing environment, e.g., SUT 122 and/or test system 100.

In step 808, the impairment test session may be initiated. Initiating the impairment test system may include generating and sending, using at least one traffic generator, test traffic via the emulated switching fabric environment and effecting at least one impairment of the testing environment during the impairment test session using a feedback control loop and the at least one impairment controller.

In some embodiments, effecting at least one impairment of a testing environment during an impairment test session may include adjusting one or more impairments of the testing environment until a target state is reached or a stop condition is met, e.g., using a feedback control loop.

In some embodiments, a feedback control loop may involve adjusting an impairment by computing an error signal based on obtained performance metric information (e.g., from one or more visibility modules) and the testing environment target state information and adjusting the impairment of the testing environment based on the error signal.

In some embodiments, obtained performance metric information may include SUT performance metric information and/or emulated switching fabric environment performance metric information.

In some embodiments, testing environment target state information may include a SUT target state definition indicating acceptable SUT performance metric information and/or an emulated switching fabric environment target state definition indicating acceptable emulated switching fabric environment performance metric information.

In some embodiments, at least one impairment of the testing environment may include a fabric crash impairment, a fabric gray failure impairment, a fabric fault tolerance impairment, or adjusting test traffic generation behavior, traffic propagation behavior, emulated switching fabric environment behavior, emulated switching fabric environment configuration, queue congestion level behavior, traffic congestion behavior, link availability, route availability, SUT behavior, or SUT configuration.

In some embodiments, predetermined calibration information may be used in effecting at least one impairment of the testing environment. For example, after performing calibration phase 700, a calibrated model comprising calibration information for instructing a testing environment to obtain one or more target state conditions.

In some embodiments, at least one impairment controller may include a first impairment controller implemented at a first network emulation platform and a second impairment controller implemented at a second network emulation platform. For example, testing applications 214 of each NEPs 114-118 may be configured for impairing emulated switching fabric environment 300 and/or for impairing test traffic generation.

In some embodiments, an emulated switching fabric environment (e.g., environment 300) may include a first emulated switch for communications involving a first set of physical ports connecting a first portion of SUT 122 and the impairment test system and a second emulated switch for communications involving a second set of physical ports connecting a second portion of SUT 122 and the impairment test system. In some embodiments, a first emulated switch or a second emulated switch appear as a rack switch to SUT 122.

In some embodiments, SUT 122 may include a network node, a server, a NIC, an application server, or a group of servers.

In some embodiments, an emulated switching fabric environment may include a Clos network environment, a multi-stage network environment, or a multi-tier network environment.

In some embodiments, various test system entities (e.g., NEPs 114-118, CIC 109, testing applications 214, etc.) may communicate via a test system API or a related server. In such embodiments, the test system API or the related server may convert or translate higher-level instructions (e.g., a gRPC API request for performance information) or data models into lower level instructions (e.g., an ASIC register query) or data models for an underlying physical switch in a NEP.

It will be appreciated that process 800 is for illustrative purposes and that different and/or additional actions may be used. It will also be appreciated that various actions described herein may occur in a different order or sequence.

It should be noted that test system 100, CTC 102, CIC 109, CM 108, NEPRA 110, NEPs 114-118, and/or functionality described herein may constitute one or more special purpose computing devices. Further, test system 100, CTC 102, CIC 109, CM 108, NEPRA 110, NEPs 114-118, and/or functionality described herein can improve the technological field of testing networks and related nodes by providing mechanisms for impairment testing involving emulated switching fabric environment, e.g., configuring and adjusting testing environment impairments during a test session based on user-specified testing environment target state information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for impairment testing using an emulated switching fabric environment, the method comprising:
    at an impairment test system implemented using at least one processor:
        receiving test configuration information for configuring a testing environment comprising an emulated switching fabric environment implemented using at least one switching application-specific integrated circuit (ASIC), wherein the test configuration information includes testing environment target state information;
        configuring, using the test configuration information, an impairment test session involving a system under test (SUT) and the emulated switching fabric environment, wherein configuring the impairment test session includes configuring at least one impairment controller for impairing the testing environment during the impairment test session using the testing environment target state information; and
        initiating the impairment test session, wherein initiating the impairment test session includes generating and sending, using at least one traffic generator, test traffic via the emulated switching fabric environment and effecting at least one impairment of the testing environment during the impairment test session using a feedback control loop and the at least one impairment controller, wherein using the feedback control loop and the at least one impairment controller to effect the impairment of the testing environment during the test session includes:
            obtaining, during the test session and from a visibility tool or visibility module, a performance metric; and
            dynamically adjusting, during the test session and based on the performance metric, the at least one impairment of the testing environment.

2. The method of claim 1 wherein adjusting the at least one impairment of the testing environment during the impairment test session includes adjusting the at least one impairment of the testing environment until a target state is reached or a stop condition is met.

3. The method of claim 2 wherein adjusting the at least one impairment of the testing environment includes:
    computing an error signal based on the performance metric and the testing environment target state information; and
    adjusting the at least one impairment of the testing environment based on the error signal.

4. The method of claim 1 wherein the performance metric includes a SUT performance metric and/or an emulated switching fabric environment performance metric.

5. The method of claim 1 wherein the testing environment target state information includes a SUT target state definition indicating acceptable SUT performance metric information and/or an emulated switching fabric environment target state definition indicating acceptable emulated switching fabric environment performance metric information.

6. The method of claim 1 wherein the at least one impairment of the testing environment includes a fabric crash impairment, a fabric gray failure impairment, a fabric fault tolerance impairment, or adjusting test traffic generation behavior, traffic propagation behavior, emulated switching fabric environment behavior, emulated switching fabric environment configuration, queue congestion level behavior, traffic congestion behavior, link availability, route availability, SUT behavior, or SUT configuration.

7. The method of claim 1 wherein predetermined calibration information is used in effecting at least one impairment of the testing environment.

8. The method of claim 1 wherein the at least one impairment controller includes a first impairment controller implemented at a first network emulation platform and a second impairment controller implemented at a second network emulation platform.

9. The method of claim 1 wherein the SUT includes a network node, a server, a network interface card, an application server, or a group of servers or wherein the emulated switching fabric environment includes a Clos network environment, a multi-stage network environment, or a multi-tier network environment.

10. A system for impairment testing using an emulated switching fabric environment, the system comprising:
    at least one processor;
    an impairment test system implemented using the at least one processor, wherein the impairment test system is configured for:
        receiving test configuration information for configuring a testing environment comprising an emulated switching fabric environment implemented using at least one switching application-specific integrated circuit (ASIC), wherein the test configuration information includes testing environment target state information;
        configuring, using the test configuration information, an impairment test session involving a system under test (SUT) and the emulated switching fabric environment; wherein configuring the impairment test session includes configuring at least one impairment controller for impairing the testing environment during the impairment test session using the testing environment target state information; and
        initiating the impairment test session, wherein initiating the impairment test session includes generating and sending, using at least one traffic generator, test traffic via the emulated switching fabric environment and effecting at least one impairment of the testing environment during the impairment test session using a feedback control loop and the at least one impairment controller, wherein using the feedback control loop and the at least one impairment controller to effect the impairment of the testing environment during the test session includes:

obtaining, during the test session and from a visibility tool or visibility module, a performance metric; and dynamically adjusting, during the test session and based on the performance metric, the at least one impairment of the testing environment.

11. The system of claim 10 wherein the impairment test system is configured for adjusting the at least one impairment of the testing environment until a target state is reached or a stop condition is met.

12. The system of claim 11 wherein adjusting the at least one impairment of the testing environment includes:

computing an error signal based on the performance metric and the testing environment target state information; and adjusting the at least one impairment of the testing environment based on the error signal.

13. The system of claim 12 wherein the performance metric includes a SUT performance metric and/or an emulated switching fabric environment performance metric.

14. The system of claim 10 wherein the testing environment target state information includes a SUT target state definition indicating acceptable SUT performance metric information and/or an emulated switching fabric environment target state definition indicating acceptable emulated switching fabric environment performance metric information.

15. The system of claim 10 wherein the at least one impairment of the testing environment includes a fabric crash impairment, a fabric gray failure impairment, a fabric fault tolerance impairment, or adjusting test traffic generation behavior, traffic propagation behavior, emulated switching fabric environment behavior, emulated switching fabric environment configuration, queue congestion level behavior, traffic congestion behavior, link availability, route availability, SUT behavior, or SUT configuration.

16. The system of claim 10 wherein the impairment test system is configured for effecting the at least one impairment of the testing environment during the impairment test session using predetermined calibration information.

17. The system of claim 10 wherein the at least one impairment controller includes a first impairment controller implemented at a first network emulation platform and a second impairment controller implemented at a second network emulation platform.

18. The system of claim 10 wherein the SUT includes a network node, a server, a network interface card, an application server, or a group of servers or wherein the emulated switching fabric environment includes a Clos network environment, a multi-stage network environment, or a multi-tier network environment.

19. A non-transitory computer readable medium having stored thereon executable instructions embodied in the non-transitory computer readable medium that when executed by at least one processor of an impairment test system cause the impairment test system to perform steps comprising:

receiving test configuration information for configuring a testing environment comprising an emulated switching fabric environment implemented using at least one switching application-specific integrated circuit (ASIC), wherein the test configuration information includes testing environment target state information;

configuring, using the test configuration information, an impairment test session involving a system under test (SUT) and the emulated switching fabric environment, wherein configuring the impairment test session configuring at least one impairment controller for impairing the testing environment during the impairment test session using the testing environment target state information; and initiating the impairment test session, wherein initiating the impairment test session includes generating and sending, using at least one traffic generator, test traffic via the emulated switching fabric environment and effecting at least one impairment of the testing environment during the impairment test session using a feedback control loop and the at least one impairment controller, wherein using the feedback control loop and the at least one impairment controller to effect the impairment of the testing environment during the test session includes:

obtaining, during the test session and from a visibility tool or visibility module, a performance metric; and dynamically adjusting, during the test session and based on the performance metric, the at least one impairment of the testing environment.

20. The non-transitory computer readable medium of claim 19, wherein adjusting the at least one impairment of the testing environment during the impairment test session includes adjusting the at least one impairment of the testing environment until a target state is reached or a stop condition is met.

* * * * *